(12) United States Patent
Suess

(10) Patent No.: US 11,906,169 B2
(45) Date of Patent: Feb. 20, 2024

(54) PORTABLE FIRE PIT

(71) Applicant: Mark Suess, Golden Valley, MN (US)

(72) Inventor: Mark Suess, Golden Valley, MN (US)

(*) Notice: Subject to any disclaimer, the term of this patent is extended or adjusted under 35 U.S.C. 154(b) by 386 days.

(21) Appl. No.: 17/337,698

(22) Filed: Jun. 3, 2021

(65) Prior Publication Data

US 2022/0390118 A1 Dec. 8, 2022

(51) Int. Cl.
| | |
|---|---|
| *F24C 1/16* | (2021.01) |
| *F24B 15/00* | (2006.01) |
| *F24B 13/02* | (2006.01) |
| *F24C 15/08* | (2006.01) |
| *B62B 5/06* | (2006.01) |
| *A47B 3/08* | (2006.01) |
| *A47B 85/06* | (2006.01) |
| *A47J 37/07* | (2006.01) |
| *B62B 3/10* | (2006.01) |

(52) U.S. Cl.
CPC .......... *F24C 1/16* (2013.01); *A47B 3/08* (2013.01); *A47B 85/06* (2013.01); *A47J 37/0763* (2013.01); *B62B 3/10* (2013.01); *B62B 5/06* (2013.01); *F24B 13/02* (2013.01); *F24B 15/002* (2013.01); *F24C 15/08* (2013.01); *A47J 2037/0795* (2013.01)

(58) Field of Classification Search
CPC ......... B62B 3/10; B62B 5/06; B62B 2202/52; F24B 1/191; F24B 1/181; F24B 13/02; F24B 15/002; A47J 37/0763; A47J 2037/0795; A47B 85/06; A47B 3/08; F24C 1/16; F24C 15/08
See application file for complete search history.

(56) References Cited

U.S. PATENT DOCUMENTS

| | | | |
|---|---|---|---|
| 2,608,190 | A | 8/1952 | Winning |
| 2,666,426 | A | 1/1954 | Pollard |
| 3,025,782 | A | 3/1962 | Stall |
| 4,463,746 | A | 8/1984 | Knuth |
| 4,726,349 | A | 2/1988 | Gehrke |
| 5,031,602 | A | 7/1991 | Vick |
| 5,203,316 | A | 4/1993 | Pritchett |
| 5,598,834 | A | 2/1997 | Grady |

(Continued)

OTHER PUBLICATIONS

Pinterest —Metal Projects—Wagon Grill—post by user dewane myers—First accessed on Dec. 15, 2020—Available from Internet <URL: https://www.pinterest.co.kr/pin/473089135827225544/>.

(Continued)

*Primary Examiner* — Alfred Basichas
(74) *Attorney, Agent, or Firm* — Gallium Law; Wesley Schwie; Isabel Fox

(57) ABSTRACT

The disclosure includes a portable fire pit comprising a housing, a first pair of wheels operatively coupled to a front portion of the housing, a second pair of wheels operatively coupled to a rear portion of the housing, and a fire pit coupled to a top portion of the housing, wherein the fire pit comprises at least one solid vertical wall. In some embodiments, the portable fire pit also includes a cover that converts to a table, as well as a suspension grate to hold firewood and a grill rack to hold food above the fire pit. The grill rack may be configured to be located at different heights above the fire pit, and may also be configured to rotate between positions directly over and to the side of the fire pit.

20 Claims, 20 Drawing Sheets

(56) References Cited

U.S. PATENT DOCUMENTS

| | | | |
|---|---|---|---|
| 5,934,183 | A | 8/1999 | Schlosser |
| 6,792,935 | B2 | 9/2004 | Williams |
| 8,316,837 | B2 | 11/2012 | Malumyan |
| 9,038,620 | B2 | 5/2015 | Brown |
| 9,074,775 | B2 | 7/2015 | McCary |
| 2009/0315351 | A1* | 12/2009 | Biddington .......... F24B 15/002 294/14 |
| 2015/0004297 | A1 | 1/2015 | Pothetes |
| 2016/0100714 | A1 | 4/2016 | Dokhanian |

OTHER PUBLICATIONS

Pinterest—The Outdoor Fire Pit Ring—post by user FireplaceLab. com—First accessed on Dec. 15, 2020—Available from Internet <URL: https://www.pinterest.co.kr/pin/811633164078576273/>.

Go Antiques—Vintage Fire Pit on Wheels, Rustic Metal Bowl, Kadai Bowl Primitive—First accessed on Dec. 15, 2020—Available from Internet <URL: https://www.goantiques.com/vintage-fire-pit-wheels-rustic-metal-bowl-kadai-bowl-primitive-80158389/>.

Matt's BBQ Pits LLC—Matt's BBQ Pits LLC 2454 Smoker with Big Wheels—video by user Matt's BBQ Pits LLC—First available Jul. 24, 2018—First accessed on Dec. 15, 2020—Available from Internet <URL: https://www.youtube.com/watch?app=desktop&v=OrzOYWn1fV0&ab_channel=Matt%27sBBQPITSLLC>.

Bizz On Wheels—BBQ & Grill Cart—First accessed on Dec. 15, 2020—Available from Internet <URL: https://www.bizzonwheels.com/food-carts/barbecue-grill-cart/>.

Cookers and Grills—7' X 24' Smoker—First accessed on Dec. 15, 2020—Available from Internet <URL: https://www.cookersandgrills.com/products.php#/backyard2>.

Ebay—Outdoor 28 Mobile Portable Round Steel Wood Fire Pit with Convenient Wheels—First accessed on Dec. 20, 2020—Available from Internet <URL: https://www.ebay.com/itm/Outdoor-28-Mobile-Portable-Round-Steel-Wood-Fire-Pit-with-Convenient-Wheels/193433039480>.

Breeo—Breeo X Series 19 Firemaster Package—Go Green Building Supply—First accessed on Jan. 8, 2021—Available from Internet <URL: https://www.gogreenbuildingsupply.com/product/breeo-x-series-19-firemaster-package/>.

Breeo—Breeo X Series 24 Firemaster Package—Go Green Building Supply—First accessed on Jan. 8, 2021—Available from Internet <URL: https://www.gogreenbuildingsupply.com/product/breeo-x-series-24-firemaster-package/>.

Breeo—Anchorpoint Attachment—First accessed on Jan. 8, 2021—Available from Internet <URL: https://breeo.co/products/breeo-anchorpoint>.

Breeo—Breeo Ash Removal Tool, Stainless Steel—Alsip Nursery—First accessed on Jan. 8, 2021—Available from Internet <URL: https://www.alsipnursery.com/product/breeo-ash-removal-tool-stainless-steel/>.

Solo Stove—Bonfire—First accessed on Mar. 30, 2021—Available from Internet <URL: https://www.solostove.com/solo-stove-bonfire/?utm_source=SSPLA&utm_medium=SSPLA&gclid=CjwKCAjwlrqHBhByEiwAnLmYUBhdvazMxTOSOTiJ_MPcgdvopw7V4hfTnnrrRUTw3GAxX15jVIVZsRoCPC8QAvD_BwE&gclsrc=aw.ds>.

NBC—Neighbors Hold Nightly Distanced Gathering to Combat Pandemic Isolation—Today—First available Mar. 29, 2021—Solo Stove on Wheels seen at 1:40—First accessed on Mar. 30, 2021—Available from Internet <URL: https://www.nbc.com/today/video/neighbors-hold-nightly-distanced-gathering-to-combat-pandemic-isolation/4335490>.

* cited by examiner

PORTABLE FIRE PIT

BACKGROUND

Field

Various embodiments disclosed herein generally relate to fire pits. More specifically, the present disclosure relates to portable fire pits.

Description of Related Art

Fire pits are outdoor accessories that enable users to gather around a fire for warmth and/or food preparation. Safer than a campfire or bonfire but more aesthetically pleasing than a barbecue grill, fire pits have grown in popularity as people around the world find themselves spending more time at home and search for ways to safely gather with friends and family outdoors. Fire pits may be permanent yard installations powered by gas, or may be stand-alone units powered by firewood or charcoal. Many traditional fire pits are comprised of metal or stone materials, and are often very heavy. The substantial weight of many fire pits limits their portability, though many users may desire to bring their fire pits to various places and events, such as a beach, a park, sporting events, and block parties. There is a need for fire pits that are easily portable and can be used and enjoyed virtually anywhere.

SUMMARY

The disclosure includes a portable fire pit comprising a housing, a first pair of wheels operatively coupled to a front portion of the housing, a second pair of wheels operatively coupled to a rear portion of the housing, and a fire pit coupled to a top portion of the housing, wherein the fire pit comprises at least one solid vertical wall. In some embodiments, the portable fire pit further comprises a cover configured to adjoin a top portion of the fire pit such that the cover extends across an open portion of the fire pit, wherein the cover is configured to extinguish a flame located within the fire pit, the cover comprising at least one handle configured to enable a user to move the cover. The portable fire pit may further comprise at least one foldable leg coupled to a bottom portion of the cover such that when the cover is adjoined to the fire pit, the at least one foldable leg may be located inside the fire pit. In many embodiments, the at least one foldable leg is configured to unfold and restably couple to a ground surface such that the cover and the at least one foldable leg form a table. The cover may define a flat cover comprising a solid, non-vented surface.

In some embodiments, the first pair of wheels comprises a first swivel caster wheel and a second swivel caster wheel, and the second pair of wheels comprises a first fixed caster wheel and a second fixed caster wheel, wherein at least one of the first pair of wheels and the second pair of wheels comprises at least one locking wheel. Each of the first swivel caster wheel, the second swivel caster wheel, the first fixed caster wheel, and the second fixed caster wheel may be configured to couple to at least one wheel mount located on the housing.

In many embodiments, the fire pit defines a round fire pit and the at least one solid vertical wall comprises a continuous solid vertical wall extending around an entire perimeter of the fire pit. The portable fire pit may further comprise a handle detachably coupled to the housing, wherein the handle may be configured to allow a user to pull the portable fire pit, and wherein when the handle is detached from the housing the handle may be configured to operate as a fire poker. In some embodiments, the first pair of wheels comprises a first wheel and a second wheel, wherein the first wheel is configured to swivel about a first axis, and the second wheel is configured to swivel about a second axis, and wherein the handle is operatively coupled to the first wheel and the second wheel such that the handle is configured to swivel at least one of the first wheel and the second wheel.

The portable fire pit may also include a suspension grate detachably coupled to the fire pit, wherein the suspension grate may be configured to hold firewood, and wherein the suspension grate may comprise a plurality of handles coupled to a top surface of the suspension grate, the plurality of handles configured to enable a user to move the suspension grate. In some embodiments, the suspension grate comprises a plurality of legs coupled to a bottom surface of the suspension grate and located opposite the plurality of handles, wherein the plurality of legs are configured to restably couple to an internal bottom portion of the fire pit, such that the top surface of the suspension grate is located a first distance above the internal bottom portion of the fire pit. The first distance may be less than or equal to about five inches.

In many embodiments, the portable fire pit further comprises a plurality of post receivers coupled to an interior portion of the at least one solid vertical wall, as well as a grill rack including an elongate post extending away from the grill rack, wherein the grill rack is configured to hold a food product and the grill rack is configured to be located over the fire pit. The plurality of post receivers may be configured to receive at least a portion of the elongate post, wherein each post receiver of the plurality of post receivers may define a different height, thereby positioning the grill rack at a different height over the fire pit. In some embodiments, the plurality of post receivers comprises a first post receiver defining a first height, a second post receiver defining a second height, and a third post receiver defining a third height. The grill rack may be configured to rotate between a first position and a second position, wherein in the first position at least a portion of the grill rack may be located directly over the fire pit, and in the second position the at least the portion of the grill rack is not located directly over the fire pit.

The housing may comprise a plurality of brackets located on a bottom portion of the fire pit, and the plurality of brackets may be configured to slideably receive the grill rack when the grill rack is not in use. In some embodiments, the plurality of brackets is configured to slideably receive the grill rack in an inverted position such that the elongate post is configured to be located adjacent the at least one solid vertical wall and extend from the bottom portion of the fire pit to the top portion of the fire pit. The grill rack may define a first size and the fire pit may define a second size, wherein the first size may be smaller than the second size.

In some embodiments, the front portion of the housing is physically separate and spaced from the rear portion of the housing. The housing, the first pair of wheels, the second pair of wheels, and the fire pit may comprise materials that are at least one of rust resistant and waterproof, such that the portable fire pit is configured to be positioned in a depth of water less than or equal to about twelve inches while maintaining a fire in the fire pit.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
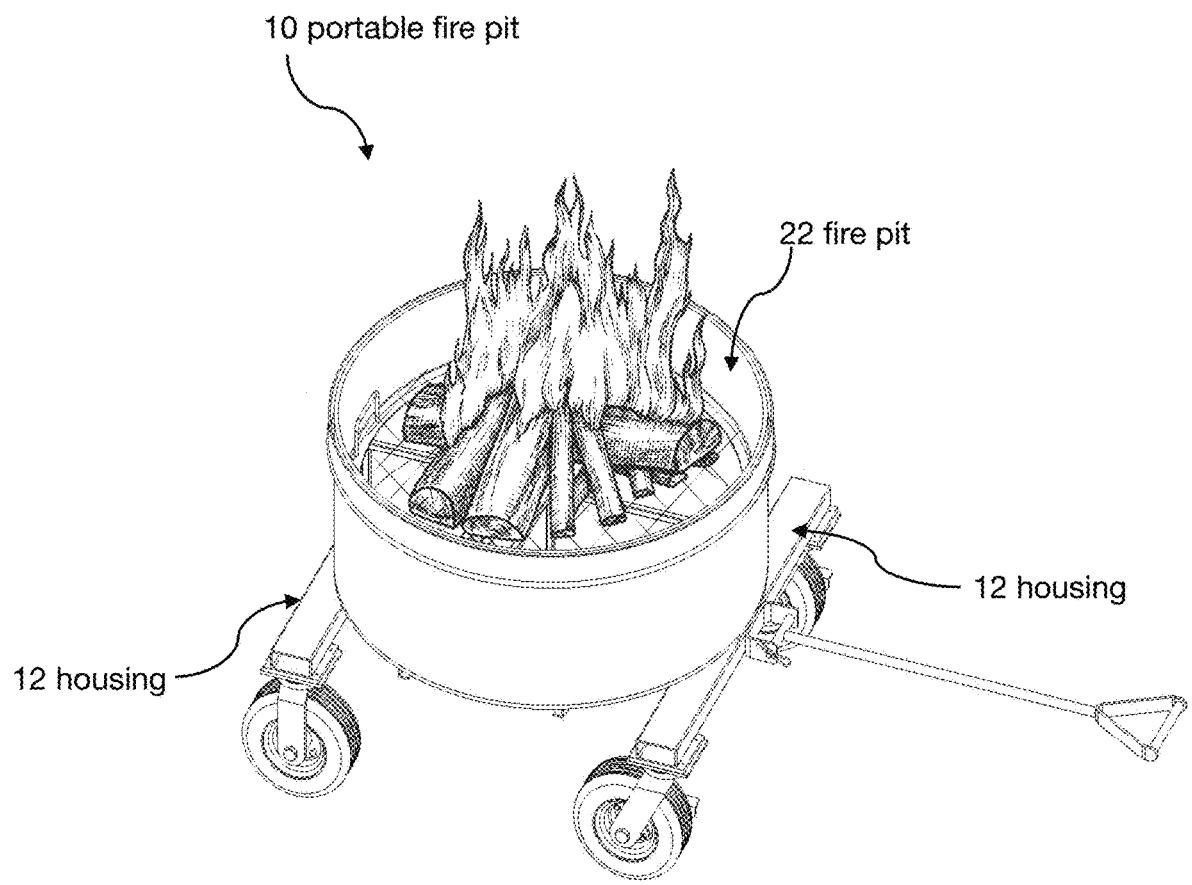
FIGS. 1 and 2 illustrate top perspective views of a fire burning in a portable fire pit, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

REFERENCE NUMERALS

10—portable fire pit
12—housing
14—first pair of wheels
14a—first swivel caster wheel
14b—second swivel caster wheel
16—second pair of wheels
16a—first fixed caster wheel
16b—second fixed caster wheel
18—front portion (of housing)
20—rear portion (of housing)
22—fire pit
24—top portion (of housing)
26—at least one solid vertical wall
28—cover
30—top portion (of fire pit)
32—open portion (of fire pit)
34—flame
35—at least one handle (of cover)
36—at least one foldable leg
38—bottom portion (of cover)
40—table
42—non-vented surface
44—wheel mount
46—hitch
48—handle
50a—first end (of handle)
50b—second end (of handle)
52—suspension grate
54—firewood
56—plurality of legs (on suspension grate)
57—suspension grate handle
58—internal bottom portion (of fire pit)
59—bottom surface (of suspension grate)
60—top surface (of suspension grate)
62—first distance
64—grill rack
66—plurality of post receivers
68—interior portion (of solid vertical wall)
70—elongate post
72a—first position (of grill rack)
72b—second position (of grill rack)
74—plurality of brackets
76—bottom portion (of fire pit)
78a—first height (of grill rack)
78b—second height (of grill rack)
78c—third height (of grill rack)

INTRODUCTION

Fire pits are popular accessories for outdoor recreation. Traditional fire pits have substantial weight and are not easily portable. Accordingly, fire pits are typically only able to be used in a single location—often a user's front or back yard—despite the fact that many users may attend various events that would benefit from the presence of a fire pit. For example, a user may want to bring their fire pit to a tailgate before a chilly autumn football game, or may simply want the flexibility to move the fire pit around their property or over to a neighbor's house. An objective of the present invention is to provide a portable fire pit capable of being easily moved around a single area or between different locations.

Figure 2:
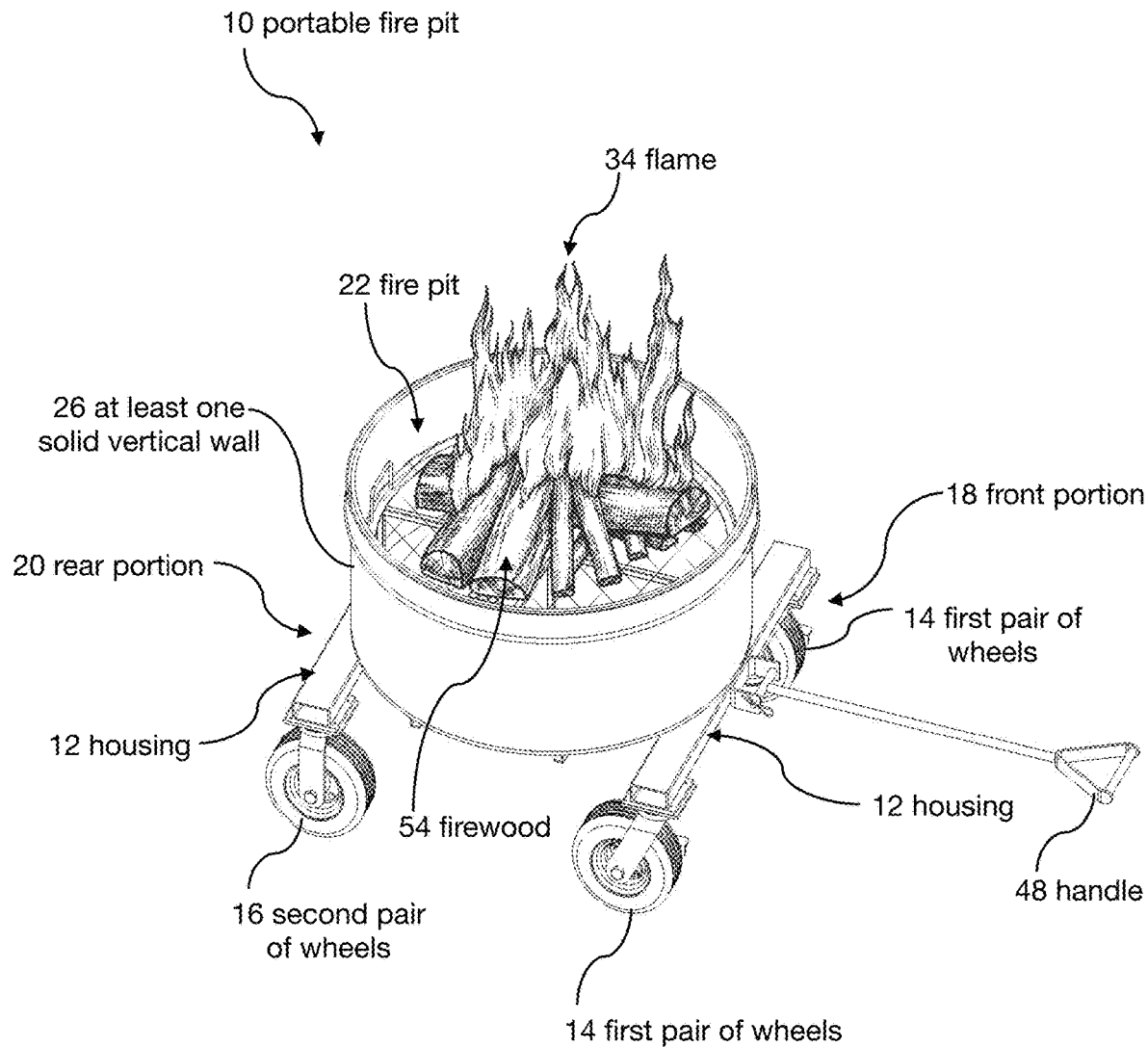

Wheel Embodiment FIG. 1 illustrates a portable fire pit 10 including a housing 12 coupled to a round fire pit 22. The fire pit 22 may define any suitable shape, including rectangular, triangular, and oval-shaped, among others. As shown in FIG. 2, in many embodiments, the portable fire pit 10 also includes a first pair of wheels 14 and a second pair of wheels 16, as well as a handle 48. The first pair of wheels 14 may be operatively coupled to a front portion 18 of the housing 12, and the second pair of wheels 16 may be operatively coupled to a rear portion 20 of the housing 12. The first and second pair of wheels 14, 16 will be discussed in greater detail with reference to FIG. 5. In some embodiments, the portable fire pit 10 weighs between about 100 and about 200 pounds, and is configured to be lifted and/or lowered by two people. The portable fire pit 10 may weigh up to about 350 pounds, and may be configured to be lifted and/or lowered by two or more people. Once on the ground, the portable fire pit 10 may pulled and/or pushed by a single person.

The fire pit 22 may be coupled to a top portion 24 (shown in FIG. 3) of the housing 12, and, in many embodiments, the fire pit 22 comprises at least one solid vertical wall 26. In some embodiments, the fire pit 22 is configured to extend to outer edges of both the front portion 18 and rear portion 20 of the housing 12, such that each portion 18, 20 of the housing 12 is substantially flush with the fire pit 22. Each of the front portion 18 and rear portion 20 of the housing 12 may comprise rectangular tubes defining the following dimensions: 1.5 inches×3 inches×0.12 inches, with a length of 30 inches. These dimensions are included as an example and intended to be nonlimiting. The housing 12 may be solid rather than comprising tubes.

The at least one solid vertical wall 26 may comprise a continuous solid vertical wall extending around an entire perimeter of the fire pit 22. The fire pit 22 may define a diameter of about 30 inches with a height of about 12 inches. In some embodiments, the fire pit 22 defines a diameter less than 30 inches and a height less than 12 inches. The fire pit 22 may define a diameter greater than 30 inches and a height greater than 12 inches. The fire pit 22 may define a diameter less than 30 inches and a height greater than 12 inches, and vice versa. The at least one solid vertical wall 26 may define a wall thickness of about 0.135 inches. In some embodiments, the fire pit 22 is fixedly coupled to the housing 12, such as via welding, adhesive, or mechanical coupling (e.g., screws or bolts). The fire pit 22 may be restably coupled to the housing 12. FIGS. 1 and 2 also illustrate the fire pit 22 containing firewood 54 and flames 34. In some embodiments, a fuel source other than firewood 54 may be used, such as charcoal.

Figure 3:
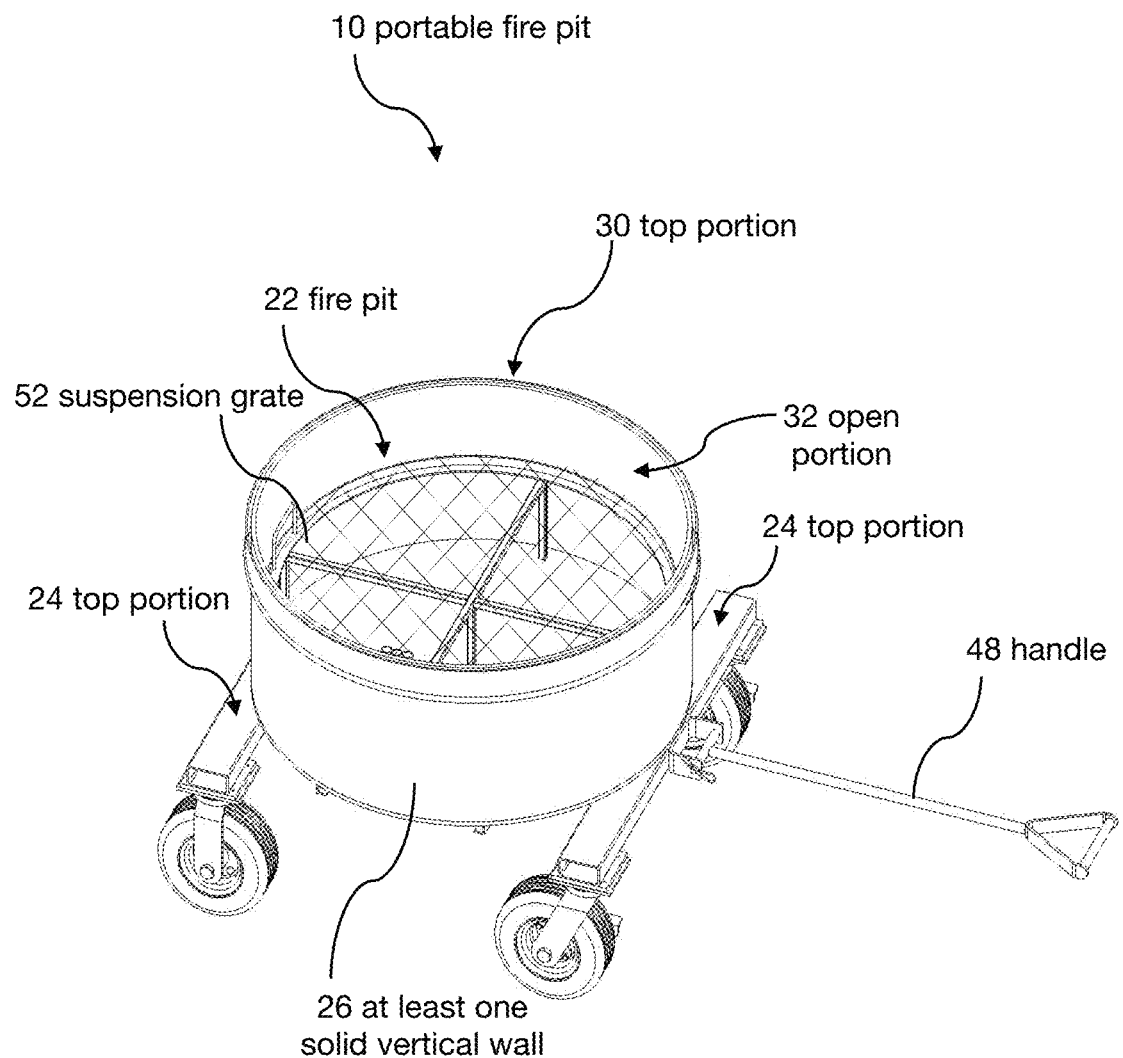
FIG. 3 illustrates a top perspective view of a portable fire pit, according to some embodiments.
Figure 4:
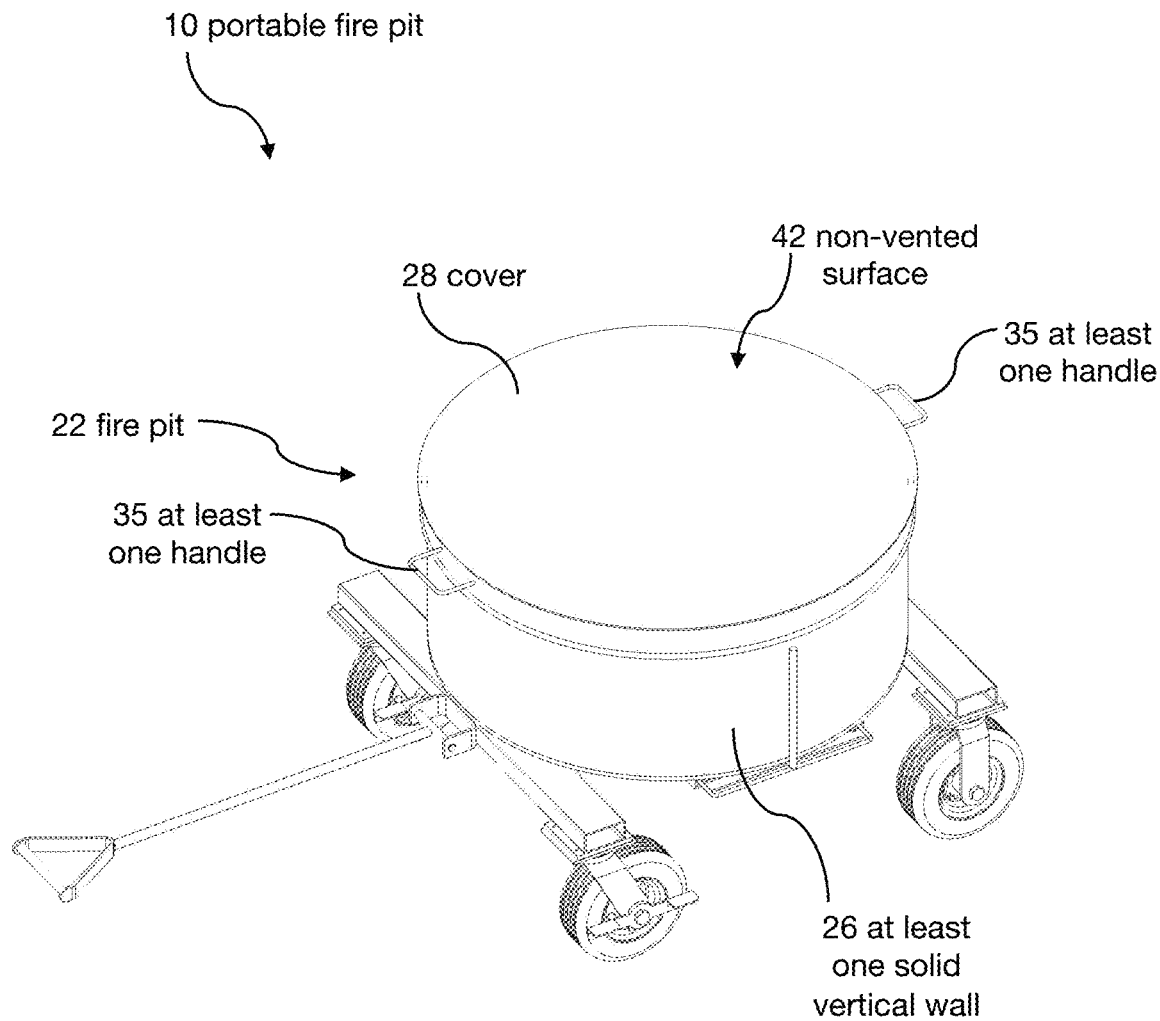
FIG. 4 illustrates a top perspective view of a portable fire pit including a cover, according to some embodiments.

FIG. 3 shows the portable fire pit 10 without the firewood 54, revealing the suspension grate 52. In many embodiments, the suspension grate 52 is configured to hold the firewood 54. The suspension grate 52 will be discussed further later in the disclosure, in particular with reference to FIGS. 10 and 11. FIG. 3 also includes the top portion 30 of the fire pit 22. In some embodiments, as shown in FIG. 4, the portable fire pit 10 includes a cover 28 configured to adjoin the top portion 30 of the fire pit 22 such that the cover 28 extends across an open portion 32 of the fire pit 22, and extinguishes the flame 34 located in the fire pit 22, illustrated in FIGS. 1 and 2. FIG. 4 also shows that the cover 28 may include at least one handle 35 to enable a user to move the cover 28. The at least one handle 35 may be located on opposite sides of the cover 28, as shown in FIG. 4. In some embodiments, the at least one handle 35 is located on a top surface of the cover 28. The at least one handle 35 may comprise 0.25 inch round bars with an inner width of 3.75 inches, an outer width of 4.27 inches, and a length of 2.625 inches. As demonstrated in FIG. 4, the cover 28 may define a flat cover with a solid, non-vented surface 42. The fire pit 22 may also include a rim extending around the circumference of the fire pit 22, as shown in FIGS. 1-3. As illustrated in FIG. 4, the rim may be visible even when the cover 28 is coupled to the fire pit 22. In some embodiments, the rim comprises a 0.5 inch hot rolled round bar with a length of about 94.25 inches (i.e. the circumference of the fire pit 22). These dimensions are included as a non-limiting example. The rim may comprise a different size, such as a 0.25 inch round bar with a different length, depending on the size of the fire pit 22. In some embodiments, the rim is located about 2.125 inches below the top edge of the fire pit 22.

Figure 5:
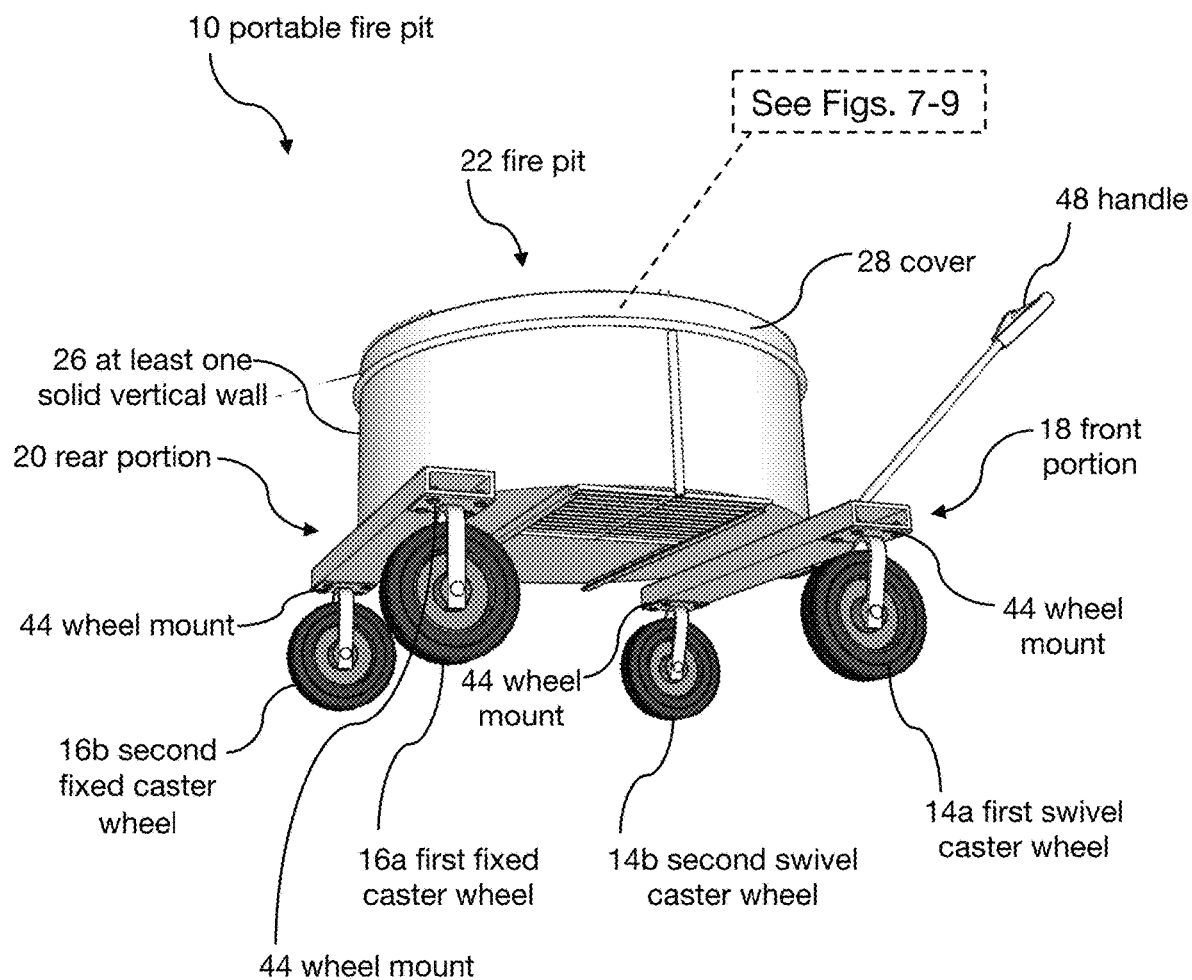
FIG. 5 illustrates a bottom perspective view of a portable fire pit including a cover, according to some embodiments.

FIG. 5 illustrates a bottom perspective view of the portable fire pit 10, and includes all four wheels. In many embodiments, as shown in FIG. 5, the first pair of wheels 14 comprises a first swivel caster wheel 14a and a second swivel caster wheel 14b, while the second pair of wheels 16 comprises a first fixed caster wheel 16a and a second fixed caster wheel 16b. At least one of the first pair of wheels 14 and the second pair of wheels 16 may comprise at least one locking wheel in order to prevent accidental movement of the portable fire pit 10, which may be especially important when a fire is burning in the fire pit 22. The at least one locking wheel may include a foot pedal brake or similar locking/brake mechanism. In some embodiments, the first swivel caster wheel 14a is configured to swivel about a first axis, and the second swivel caster wheel 14b is configured to swivel about a second axis. The handle 48 may be operatively coupled to the first and second swivel caster wheels 14a, 14b such that the handle 48 is configured to swivel at least one of the first and second swivel caster wheels 14a, 14b. As previously mentioned, in some embodiments, the first pair of wheels 14 is coupled to a front portion 18 of the housing 12 and the second pair of wheels 16 is coupled to a rear portion 20 of the housing 12.

At least one of the first swivel caster wheel 14a, the second swivel caster wheel 14b, the first fixed caster wheel 16a, and the second fixed caster wheel 16b may be coupled to at least one wheel mount 44 located on the housing, as shown in FIG. 5. In many embodiments, the wheel mount 44 is coupled to a bottom portion of the housing 12 located opposite the top portion 24, where the housing 12 couples to the fire pit 22. Each wheel mount 44 may define a 4 inch×4 inch×0.313 inch metal square with four holes for coupling each wheel to the wheel mount 44. In some embodiments, each wheel couples to the housing 12 through the holes in each wheel mount 44. The holes may be equally spaced on each wheel mount 44, or may be unequally spaced. For example, a first hole and a second hole located along a first edge may be spaced from one another by a distance of 3.313 inches, while the second hole and a third hole located along a second edge perpendicular to the first edge may be spaced from one another by a distance of 2.813 inches. It should be noted that the dimensions included herein are intended to be nonlimiting examples. In some embodiments, each wheel mount 44 is fixedly coupled to the housing 12, such as via welding, adhesive, or a similar method. The portable fire pit 10 may include at least one axle coupled to at least one of the first pair of wheels 14 and the second pair of wheels 16. For example, an axle may extend between the first fixed caster wheel 16a and the second fixed caster wheel 16b, but not between the first swivel caster wheel 14a and the second swivel caster wheel 14b.

Figure 6:
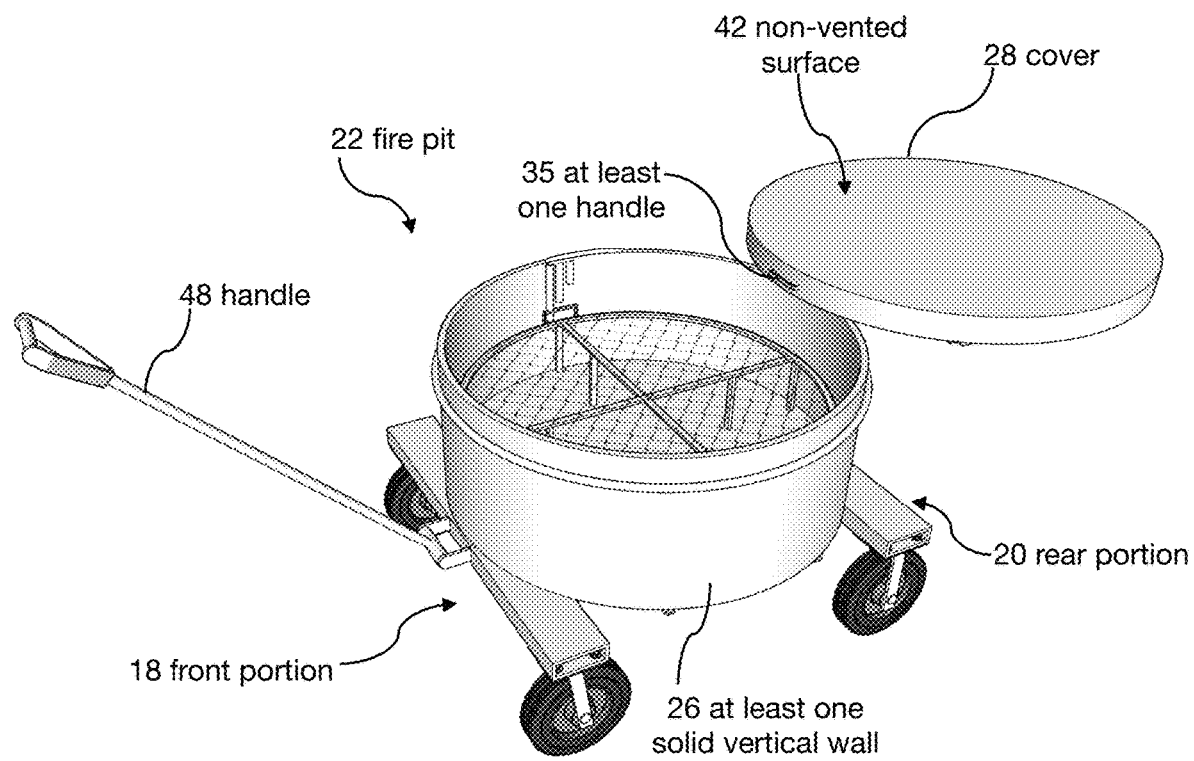
FIG. 6 illustrates a top perspective view of a portable fire pit and a cover, according to some embodiments.
Figure 7:
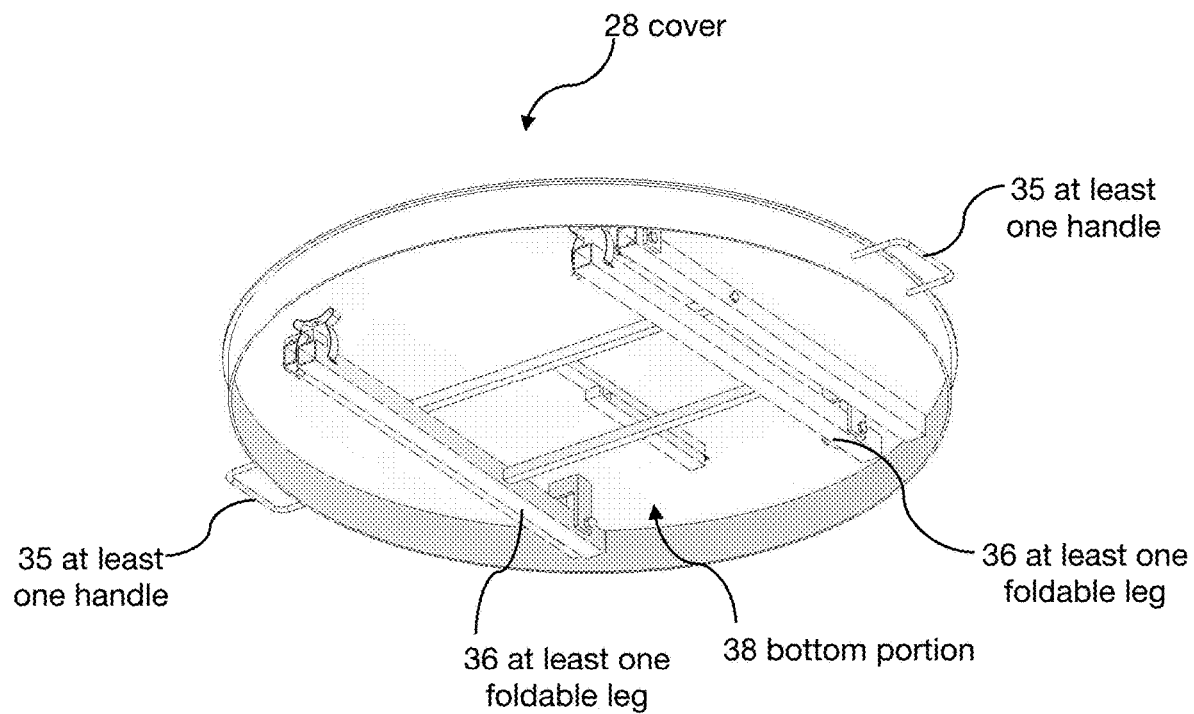
FIG. 7 illustrates a bottom perspective view of a cover of a portable fire pit, according to some embodiments.
Figure 8:
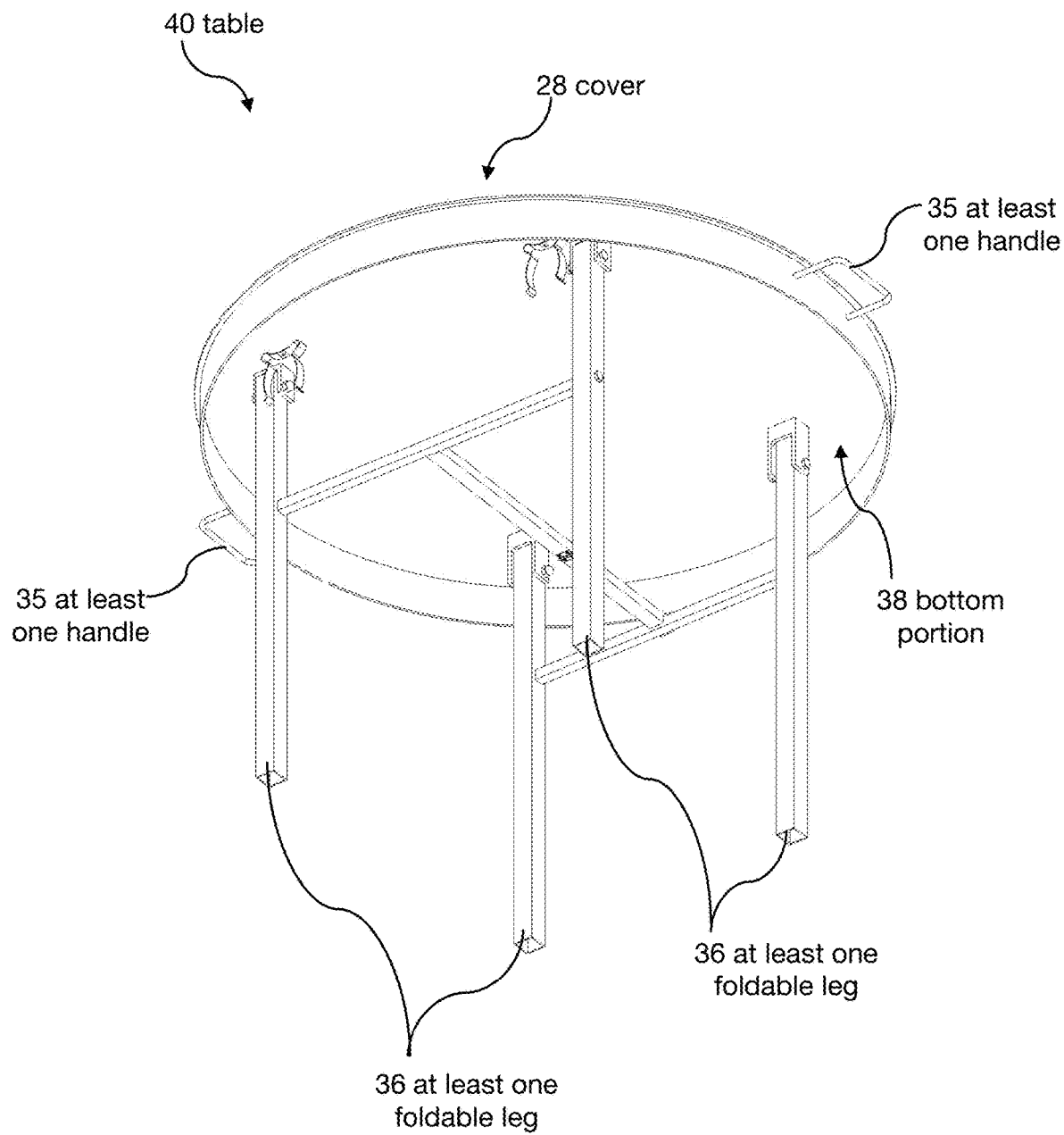
FIG. 8 illustrates a bottom perspective view of a cover operating as a table, according to some embodiments.
Figure 9:
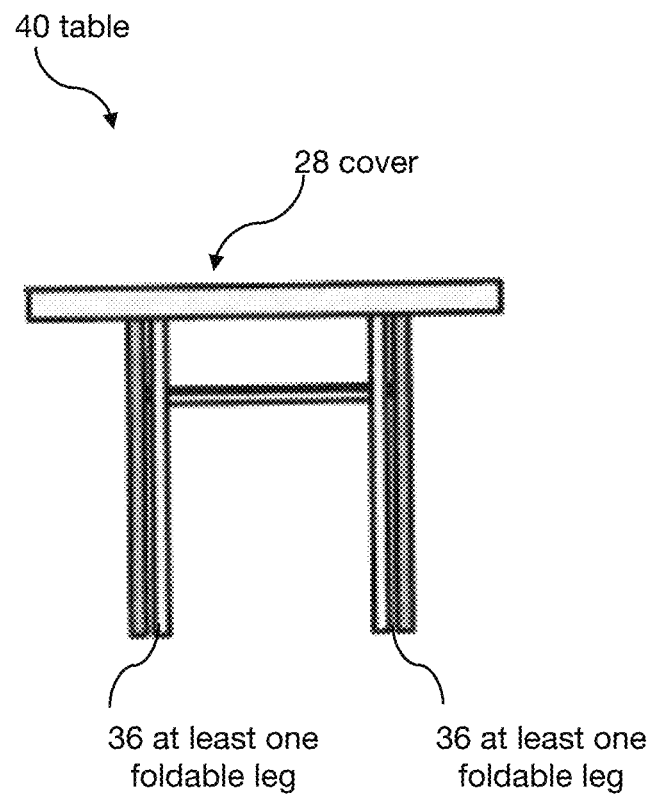
FIG. 9 illustrates a side view of a cover operating as a table, according to some embodiments.

FIG. 6 shows the cover 28 uncoupled from the fire pit 22. The cover 28 may detachably couple to the fire pit 22 via a friction fit. In many embodiments, the cover 28 restably couples to the fire pit 22. As indicated in FIG. 5, FIGS. 7-9 focus on the cover 28. Turning now to FIG. 7, a bottom perspective view of the cover 28 is shown. In some embodiments, the cover 28 includes at least one foldable leg 36 coupled to a bottom portion 38 of the cover 28 such that when the cover 28 is adjoined to the fire pit 22, the at least one foldable leg 36 is located inside the fire pit 22. As demonstrated in FIG. 7, the cover 28 may define a depth greater than the at least one foldable leg 36 in the folded position, such that the at least one foldable leg 36 may not extend past the cover 28. The depth may define about 2 inches. In addition, in many embodiments, the cover 28 is configured to fit over an outer edge of the fire pit 22, as opposed to within an interior portion of the fire pit 22. Accordingly, as illustrated, the at least one foldable leg 36 may not extend all the way to an inner edge of the cover 28 in order to leave room for a top edge of the fire pit 22 to be received by the cover 28. In some embodiments, the at least one foldable leg 36 is configured to unfold and restably couple to a ground surface such that the cover 28 and the at least one foldable leg 36 form a table 40, as shown in FIGS. 8 and 9.

FIG. 8 illustrates a bottom perspective view and FIG. 9 illustrates a side view of the table 40 formed by the cover 28 and at least one foldable leg 36. As shown in FIG. 8, in many embodiments, the at least one foldable leg 36 comprises four straight legs configured to extend from the bottom portion 38 of the cover 28 at a 90 degree angle. The at least one foldable leg 36 may comprise 1.0 inch×1.0 inch×0.065 inch bars with a length of 21 inches. The at least one foldable leg 36 may comprise solid or hollow legs. The at least one foldable leg 36 may comprise more than four legs and may comprise straight or bowed legs. The at least one foldable leg 36 may comprise fewer than four legs and may comprise straight or bowed legs. In some embodiments, the at least one foldable leg 36 forms an "X" shape beneath the cover 28, rather than having the perpendicular bars and 90 degree angles shown in FIG. 8.

In some embodiments, the at least one foldable leg 36 comprises a first leg assembly and a second leg assembly. The first leg assembly may include a first leg, a second leg, a threaded bar coupling the first leg to the second leg, a 0.75 inch×0.5 inch bar coupled to the threaded bar, and a notched bar coupled to 0.75 inch×0.5 inch bar via a hinge. The second leg assembly may include a third leg and a fourth leg, as well as a 0.5 inch×0.5 inch bar coupling the third leg to the fourth leg. In many embodiments, when the at least one foldable leg 36 is in an unfolded position, the notched bar is configured to extend and the notch is configured to receive the 0.5 inch×0.5 inch bar, thereby coupling the first leg assembly to the second leg assembly. The threaded bar may also comprise a 0.5 inch×0.5 inch bar, and may be configured to couple to the first leg and the second leg via a bolt, screw, or similar threaded coupling mechanism. In some embodiments, the 0.75 inch×0.5 inch bar defines a length of 10 inches, and is coupled to the threaded bar via welding or a similar method. The notched bar may also comprise a 0.75 inch×0.5 inch bar, with a length of 7.625 inches and a notch width of 0.56 inches. All of the listed dimensions are included as examples and intended to be non-limiting. Each of the first leg, second leg, third leg, fourth leg, threaded bar, notched bar, the 0.5 inch×0.5 inch bar extending between the third and fourth legs, and the 0.75 inch×0.5 inch bar coupled to the threaded bar may comprise solid bars or hollow tubes.

The table 40 may comprise spring clips coupled to the bottom portion 38 of the cover 28, and the spring clips may be configured to hold the at least one foldable leg 36 in the folded position. The table 40 may comprise any number of suitable mechanisms for retaining the at least one foldable leg 36 in the folded position. The table 40 may comprise fewer than four spring clips, as shown in FIG. 7, because, in some embodiments, only two legs are required to be retained in spring clips to keep all four legs in the folded position. In addition to the spring clips (or similar mechanism), the table 40 may comprise metal clips configured to couple each leg of the at least one foldable leg 36 to the bottom portion 38 of the cover 28. The metal clips may comprise an inverted "U" shape, where a flat base of the inverted "U" is configured to couple to the bottom portion 38 and the sides of the "U" are configured to receive each leg. In some embodiments, each leg comprises a first end rotatably coupled to a metal clip via at least one bolt, screw, or similar mechanism (to allow the legs to fold and unfold) and a second end configured to contact a ground surface. The "metal" clips may comprise any suitable material(s), including plastic. The metal clips may be fixedly coupled to the cover 28 via welding, adhesive, or a similar method. The spring clips may be mechanically coupled to the cover 28 via a rivet, screw, bolt, or similar mechanism.

As previously mentioned, in many embodiments, the cover 28 comprises a flat cover as shown in FIG. 9. Having a flat cover 28 may enable users to most effectively use the table 40 by providing maximum tabletop space. For example, if the at least one handle 35 were located on top of the cover 28, rather than on the sides (as shown in FIG. 8), there would be less space on top of the table 40 to place food, drinks, grilling utensils, and/or other items. In addition, if the cover 28 had a domed shape like a cover for a traditional barbecue grill, rather than the flat shape shown in the Figures, the cover 28 would not be able to be used as a table 40. A top surface of the cover 28 may be configured to extend slightly beyond (e.g., overhang) the rest of the cover 28, as shown in FIGS. 7 and 8. In some embodiments, the top surface of the cover 28 defines a diameter of about 31.25 inches and a depth of about 0.125 inches. The rest of the cover 28 may define a diameter of about 30.75 inches, a depth of about 2 inches, and a wall thickness of about 0.125 inches. Accounting for the length of each leg of the at least one foldable leg 36, the top surface of the cover 28, and the metal clips coupling each leg to the cover 28, the overall height of the table 40 may be about 22 inches. These dimensions are included as non-limiting examples.

Figure 10:
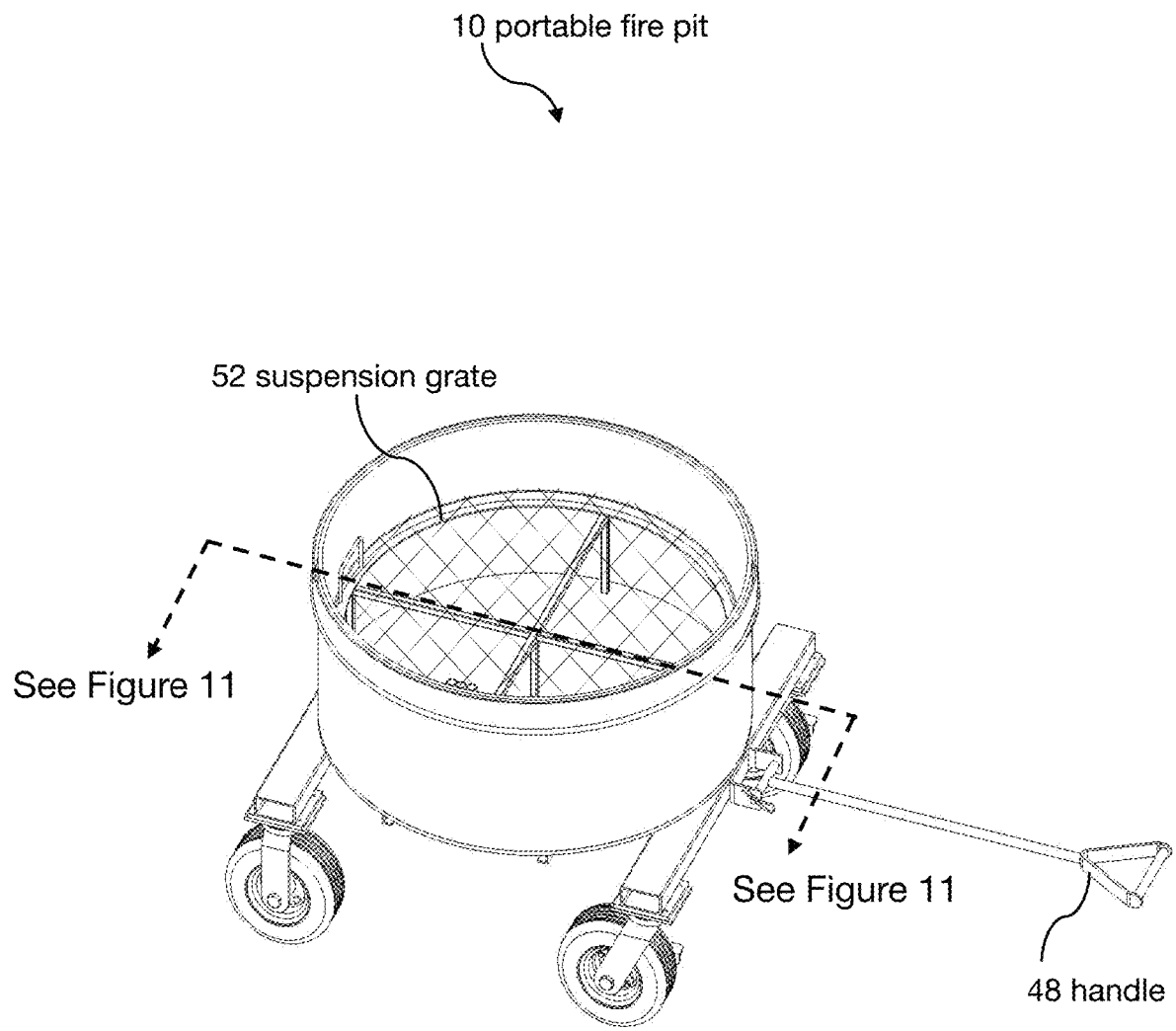
FIG. 10 illustrates a top perspective view of a portable fire pit including a suspension grate, according to some embodiments.

FIG. 10 shows another top perspective view of the portable fire pit 10, including the suspension grate 52 and handle 48. In some embodiments, the suspension grate 52 is detachably coupled to the fire pit 22 and is configured to hold firewood 54, as shown in FIGS. 1 and 2. The suspension grate 52 may also comprise a plurality of handles coupled to a top surface 60 (shown in FIG. 11) of the suspension grate 52, where the plurality of handles may be configured to enable a user to move the suspension grate 52. In many embodiments, the plurality of handles comprises two handles. Each handle may comprise 0.25 inch round bar with an inner width of 3.75 inches, an outer width of 4.25 inches, and a length of 2.625 inches. These dimensions are included as examples and intended to be non-limiting.

Figure 11:
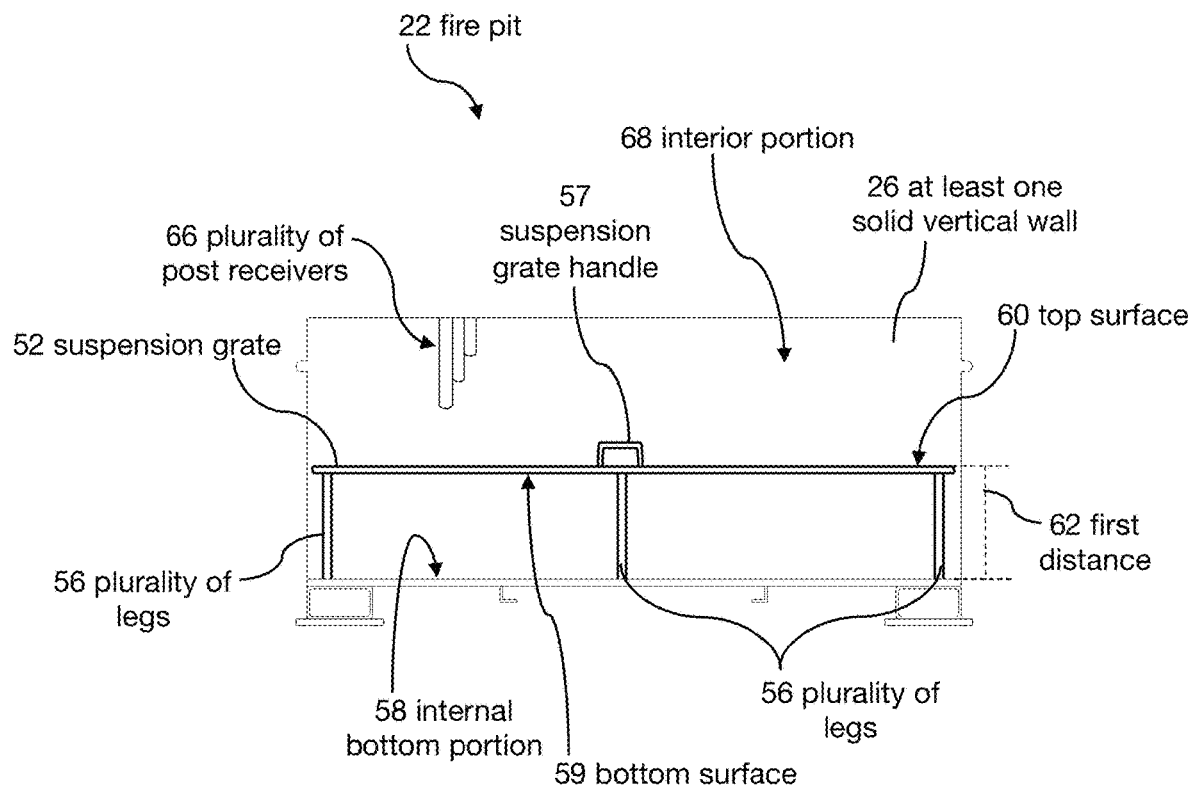
FIG. 11 illustrates a cross-sectional view of a portable fire pit including a suspension grate, according to some embodiments.

In some embodiments, the suspension grate 52 defines a diameter of about 28 inches. The suspension grate 52 may include "+" shaped support bars to prevent sagging of the grate 52 under the weight of firewood 54. In some embodiments, the support bars comprise 0.5 inch×0.5 inch×0.065 inch tubes. The suspension grate 52 may also comprise a rolled angle outer edge configured to couple to the plurality of handles. The rolled angle outer edge may define a 0.75 inch×0.125 inch angle with a 28 inch diameter. In many embodiments, the rolled angle outer edge is configured to couple to #9 expanded steel, which forms the "grate" part of the suspension grate 52. The grate may define a diameter of about 27.275 inches and a thickness of 0.134 inches. As indicated in FIG. 10, FIG. 11 illustrates a cross-sectional view of the fire pit 22. For the sake of clarity of the Figures, FIG. 11 may not include all of the same elements as FIG. 10. For example, FIG. 11 does not include the wheels, which are shown in FIG. 10.

In many embodiments, the suspension grate 52 comprises a plurality of legs 56 coupled to a bottom surface 59 of the suspension grate 52 and located opposite the plurality of handles, indicated by the suspension grate handle 57 in FIG. 11. The plurality of legs 56 may comprise 0.5 inch×0.5 inch×0.065 inch tubes, like the support bars discussed above. The plurality of legs 56 may be configured to couple to the support bars. In some embodiments, the plurality of legs 56 comprises five legs. The plurality of legs 56 may comprise fewer than five legs. The plurality of legs 56 may comprise more than five legs. FIG. 11 also shows that the plurality of legs 56 may be configured to restably couple to an internal bottom portion 58 of the fire pit 22, such that the top surface 60 of the suspension grate 52 is located a first distance 62 above the internal bottom portion 58 of the fire pit 22. In some embodiments, the first distance 62 is about 5 inches. The first distance 62 may be greater than 5 inches. In some embodiments, the first distance 62 is less than 5 inches. When the first distance 62 is about 5 inches, the fire pit 22 may have about 7 inches for firewood 54 between the top surface 60 of the suspension grate 52 and the top portion 30 of the fire pit 22. Of course, the firewood 54 may extend above the top portion 30 of the fire pit 22.

The area between the suspension grate 52 and the internal bottom portion 58 of the fire pit 22 may comprise an area for ash collection while burning a fire in the fire pit 22. The area may also help keep a fire burning by allowing air circulation beneath the suspension grate 52, and, therefore, beneath the fire. The possibility of air circulation within the fire pit 22 further distinguishes the claimed portable fire pit 10 from traditional fire pits, which often require at least one ventilation opening on a side wall to enable air circulation. In contrast, the portable fire pit 10 comprises a solid fire pit 22 with the at least one solid vertical wall 26, and no ventilation openings. In addition, the bottom piece of the fire pit 22 may comprise a solid, non-vented surface substantially similar to the at least one solid vertical wall 26 with a thickness of about 0.135 inches. In many embodiments, the bottom piece is welded, or coupled in a similar permanent manner, to the at least one solid vertical wall 26.

As previously mentioned, the cover 28 may be used to quickly extinguish the fire. The ability to quickly extinguish the fire further distinguishes the present invention from a traditional campfire-style fire pit, which may often take a significant amount of time to completely burn out. As the fire in the fire pit 22 is extinguished, smoke may escape from a gap between the fire pit 22 and the cover 28. Stated differently, the cover 28 may not form an air-tight seal to the fire pit 22, but may block the intake of air enough to snuff out a fire. In many embodiments, like the at least one solid vertical wall 26, the cover 28 also comprises a solid surface with no ventilation openings. After allowing the ashes to cool for an appropriate amount of time (e.g., overnight), a user may then remove the suspension grate 52 via the suspension grate handle 57 and/or a plurality of handles, and scoop or dump out the ashes for proper disposal. Due to the large size of the fire pit 22 and the ample space below the suspension grate 52, a user may be able to burn several fires before needing to empty out the ashes.

The fire pit 22 may also comprise a trapdoor-type mechanism located in the internal bottom portion 58 for ash removal. The trapdoor-type mechanism may comprise a locking mechanism in order to prevent the accidental release of hot ashes; for example, when moving the portable fire pit 10. FIG. 11 also illustrates that, in many embodiments, the fire pit 22 comprises a plurality of post receivers 66 coupled to an interior portion 68 of the at least one solid vertical wall 26. The plurality of post receivers 66 may be configured to couple to a grill rack 64, which will be discussed in greater detail later in the disclosure.

Figure 12:
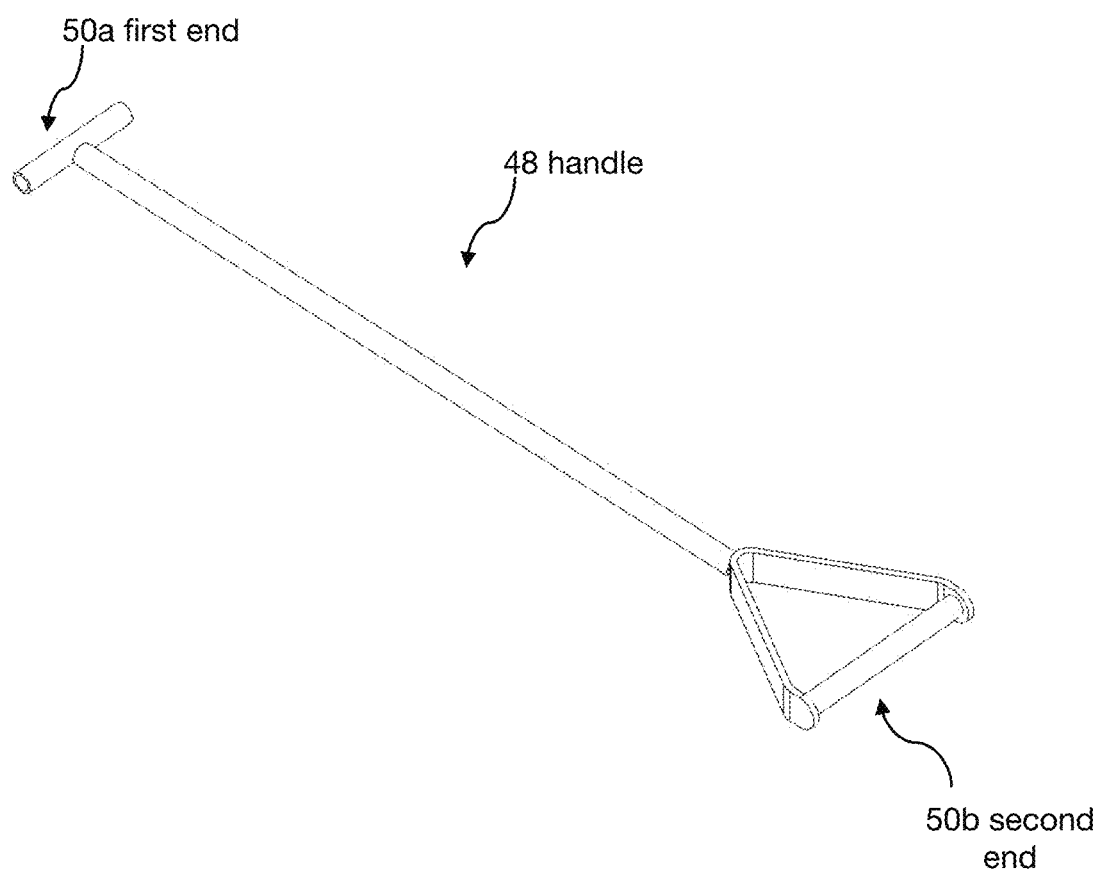
FIG. 12 illustrates a perspective view of a handle of a portable fire pit, according to some embodiments.

Turning now to FIG. 12, a perspective view of the handle 48, including a first end 50a and second end 50b, is shown. In many embodiments, the first end 50a is configured to detachably couple to a hitch 46 (shown in FIG. 13) coupled to the front portion 18 of the housing 12. The second end 50b may be configured to be pulled and/or pushed by a user in order to move the portable fire pit 10. When the handle 48 is detached from the housing 12, as illustrated in FIG. 12, the handle 48 may be configured to operate as a fire poker. The second end 50b of the handle 48 may define a triangle shape, as shown in FIG. 12, or may define any other suitable shape. For example, the second end 50b may define a shape substantially the same as the first end 50a. The second end 50b may also define another shape, such as a rectangular shape. In some embodiments, the handle 48 defines a total length of about 30 inches from the first end 50a to the second end 50b. The handle 48 may define a length of less than 30 inches. The handle 48 may define a length greater than 30 inches. In some embodiments, the second end 50b defines a width of about 5.5 inches to allow a user to comfortably pull and/or push the portable fire pit 10 via the second end 50b of the handle 48. Each of the first end 50a, second end 50b, and middle section of the handle 48 may comprise 0.625 inch×0.083 inch round metal tubing. The dimensions included herein are intended as non-limiting examples, and actual dimensions of the handle 48 may vary from the exact dimensions listed here.

Figure 13:
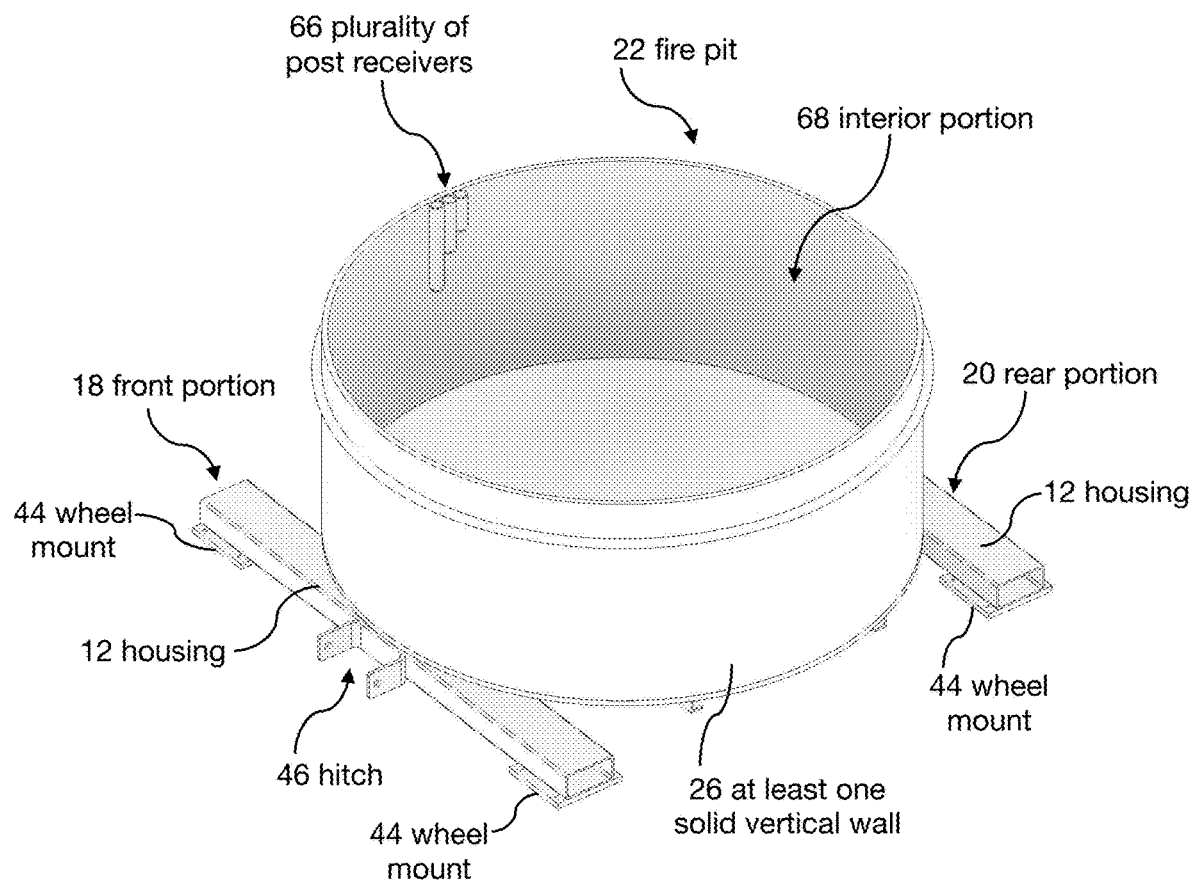
FIG. 13 illustrates a top perspective view of a portable fire pit, according to some embodiments.

FIG. 13 shows a top perspective view of the fire pit 22. Included in FIG. 13 are the housing 12 with the front portion 18 and rear portion 20, as well as the wheel mounts 44 discussed with reference to FIG. 5. FIG. 13 also shows the hitch 46 which, in many embodiments, is configured to detachably couple to the first end 50a of the handle 48. The first end 50a may be configured to fit within the hitch 46 such that either side of the hitch 46 is located on the outer ends of the first end 50a, and the hitch 46 receives the first end 50a. The hitch 46 may define an inner width of about 3.875 inches, and, accordingly, the first end 50a may define a width substantially equal to, or slightly less than, 3.875 inches. For example, the first end 50a may define a width of about 3.75 inches. The hitch 46 may extend from the front portion 18 a distance of about 2.5 inches and may comprise a height of about 1.5 inches, such that the hitch 46 is flush with the top and bottom edges of the front portion 18 of the housing 12. These dimensions are included as examples and intended to be non-limiting. In some embodiments, the hitch 46 is fixedly coupled to the housing 12. The hitch 46 may be secured to the first end 50a via any number of possible mechanisms, including at least one locking pin or similar devices. In some embodiments, the at least one locking pin (or similar device) extends through a first side of the hitch 46, all the way through the first end 50a of the handle 48, and through the second side of the hitch 46.

FIG. 13 also shows the plurality of post receivers 66 located on the interior portion 68 of the fire pit 22. The plurality of post receivers 66 may be arranged such that the top edge of each post receiver is substantially flush with the top edge of the fire pit 22. In this way, the plurality of post receivers 66 may be configured to not impede placement of the cover 28 over the fire pit 22. In some embodiments, the plurality of post receivers 66 comprises a first post receiver defining a first height, a second post receiver defining a second height, and a third post receiver defining a third height. The first height may be about 5 inches, the second height may be about 3 inches, and the third height may be about 2 inches. With the exception of the height, each post receiver may define substantially the same dimensions. For example, in some embodiments, each post receiver defines a 0.75 inch×0.083 inch seamless tube with a 0.125 inch end cap located on a bottom portion of each tube (e.g., closest to the suspension grate 52). Each post receiver of the plurality of post receivers 66 may define a different height (or other dimension) than stated in this disclosure. In many embodiments, each post receiver of the plurality of post receivers 66 defines a different height such that the plurality of post receivers 66 defines three different heights.

Figure 14:
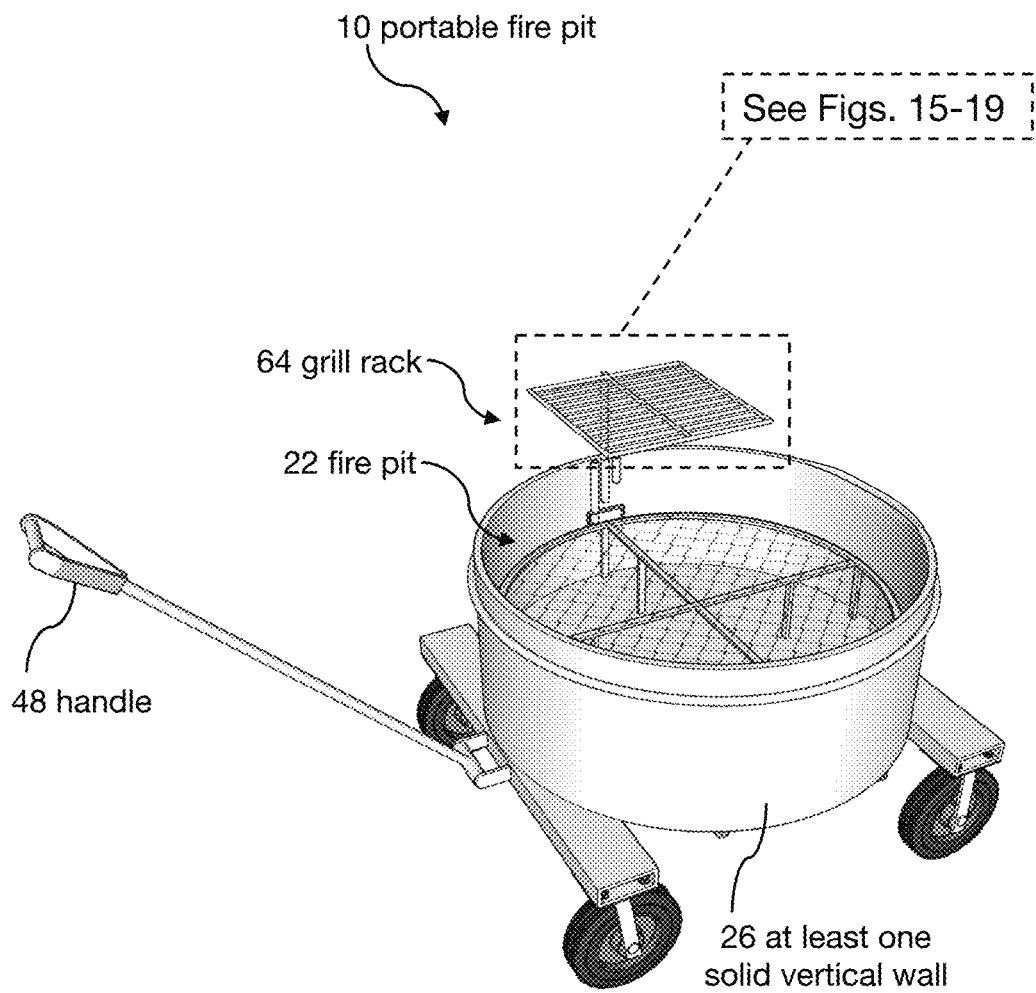
FIG. 14 illustrates a top perspective view of a portable fire pit including a grill rack, according to some embodiments.

FIG. 14 shows a grill rack 64 coupled to the plurality of post receivers 66. In some embodiments, the portable fire pit 10 comprises a grill rack 64 including an elongate post 70 (shown in FIG. 15) extending away from the grill rack 64. The grill rack 64 may be located over the fire pit, as illustrated in FIG. 14, and may be configured to hold a food product. Accordingly, the grill rack 64 may be used to heat food over the fire pit 22. In many embodiments, the plurality of post receivers 66 are configured to receive at least a portion of the elongate post 70 and position the grill rack 64 at different heights over the fire pit 22, according to the height of each post receiver. Each post receiver of the plurality of post receivers 66 may comprise a cylinder with a closed end to prevent the elongate post 70 from sliding too far through each post receiver.

Figure 15:
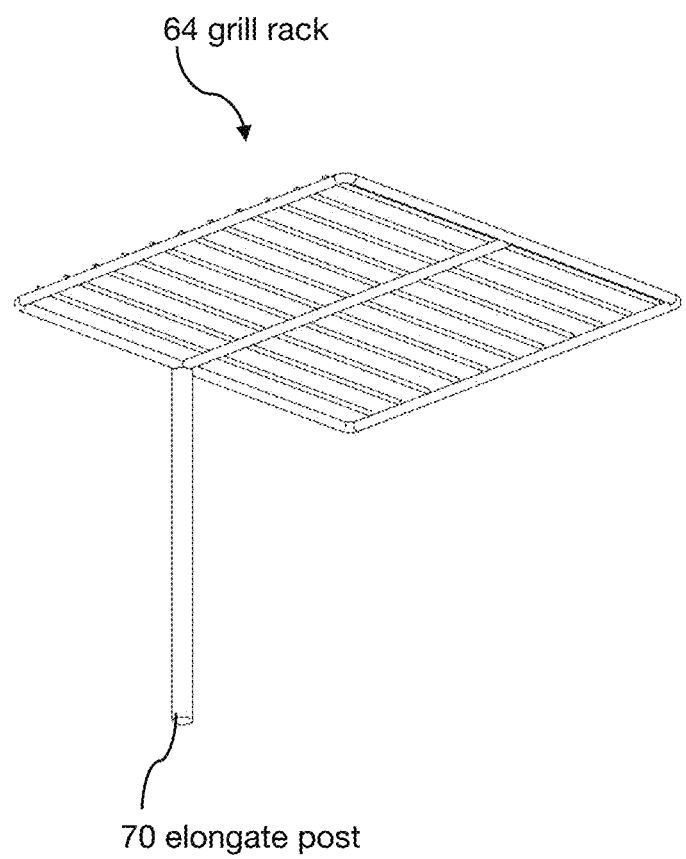
FIG. 15 illustrates a perspective view of a grill rack, according to some embodiments.

A perspective view of the grill rack 64 coupled to the elongate post 70 is shown in FIG. 15. The grill rack 64 may be fixedly coupled to the elongate post 70, such as via at least one of welding, adhesive, mechanical coupling (e.g., bolt, screw, etc.), or a similar method. In some embodiments, the elongate post 70 defines a length of about 9 inches. The elongate post 70 may define a length less than 9 inches. In some embodiments, the elongate post 70 defines a length greater than 9 inches. As illustrated in FIG. 15, the grill rack 64 may define a rectangular shape. In some embodiments, the grill rack 64 defines a square shape and measures about 12 inches×12 inches. The grill rack 64 may define any suitable shape, including a circle, an oval, a triangle, and the like. The elongate post 70 may be substantially centered on one edge of the grill rack 64. In some embodiments, the grill rack 64 defines a first size and the fire pit 22 defines a second size that is larger than the first size. The first size may be larger than the second size. In some embodiments, the first size is substantially the same as the second size. In a square/rectangular embodiment, the grill rack 64 may comprise 0.25 inch round bars along all four edges and along a center portion, and may comprise 0.125 inch round bars extending across opposite edges to form the "rack" portion of the grill rack 64, as shown in FIG. 15. The elongate post 70 may comprise a 0.5 inch round bar.

Figure 16:
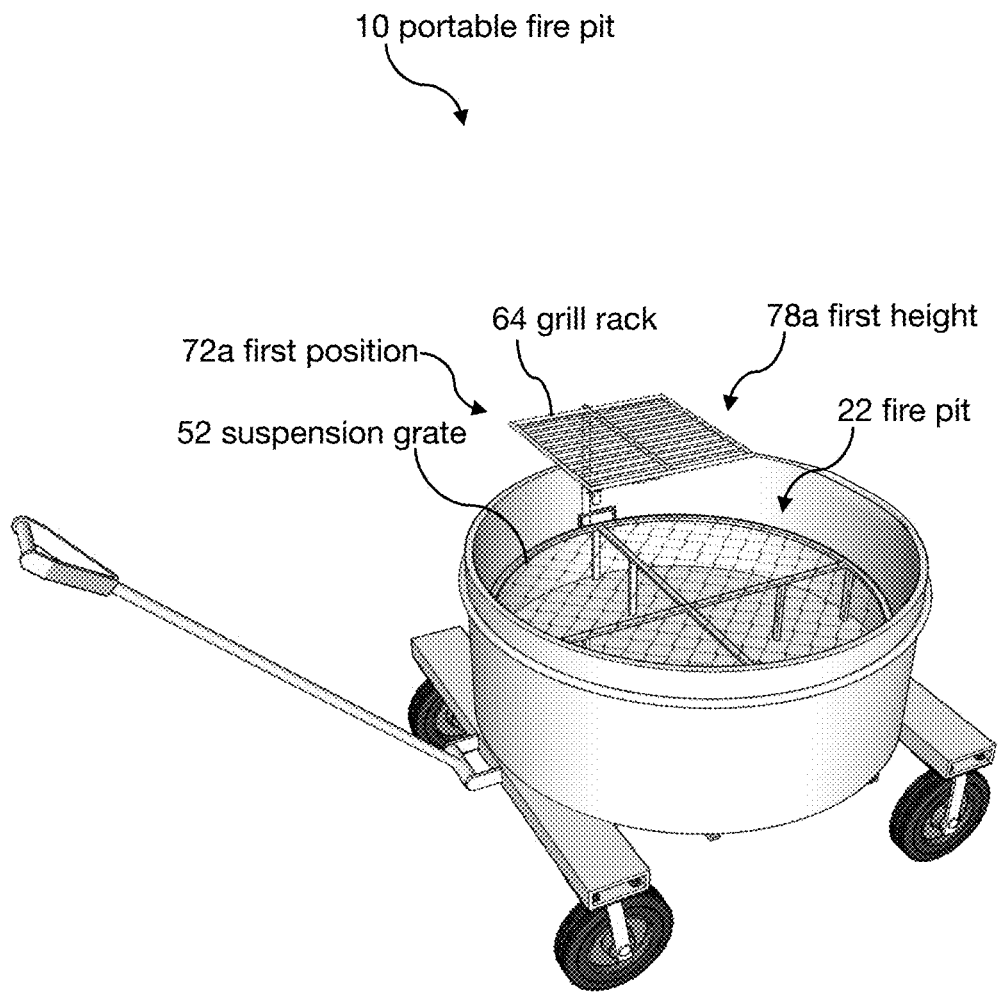
FIGS. 16, 17, 18, and 19 illustrate top perspective views of a portable fire pit including a grill rack in different positions, according to some embodiments.
Figure 19:
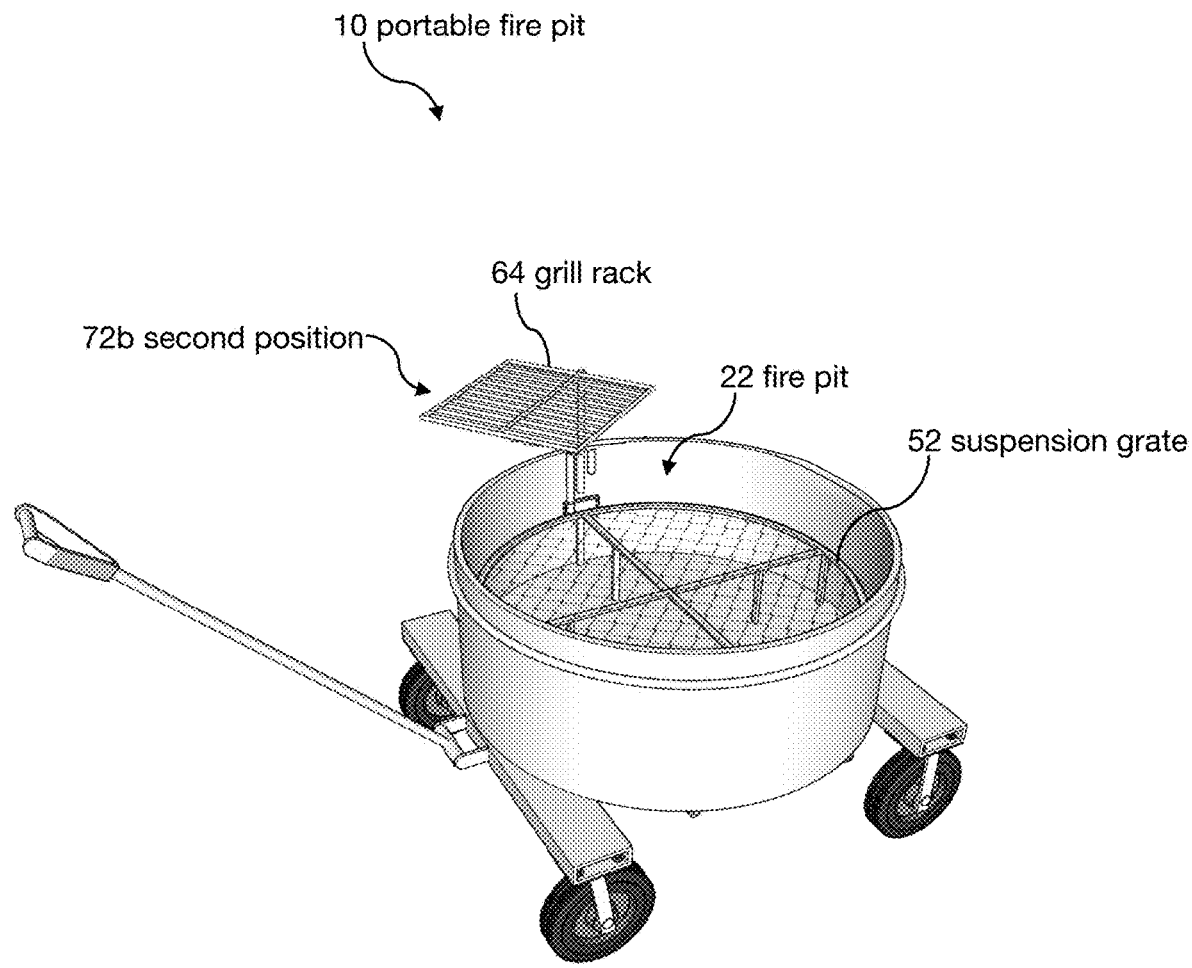

In many embodiments, the grill rack 64 is configured to rotate between a first position 72a, shown in FIG. 16, and a second position 72b, shown in FIG. 19. In the first position 72a, as demonstrated in FIG. 16, at least a portion of the grill rack 64 may be located directly over the fire pit 22. Comparatively, as demonstrated in FIG. 19, when the grill rack 64 is in the second position 72b, at least a portion of the grill rack 64 may not be located directly over the fire pit 22. FIG. 16 also shows the grill rack 64 at a first height 78a. As previously discussed, the grill rack 64 may be configured to be located at different heights over the fire pit 22 depending on which post receiver of the plurality of post receivers 66 is coupled to the grill rack 64. FIG. 16 shows the grill rack 64 coupled to the first post receiver, or the leftmost/longest post receiver. The first height 78a may represent the lowest height of the grill rack 64. Stated differently, in many embodiments, when the grill rack 64 is coupled to the longest post receiver, the grill rack 64 is lowest over the fire pit 22.

Figure 17:
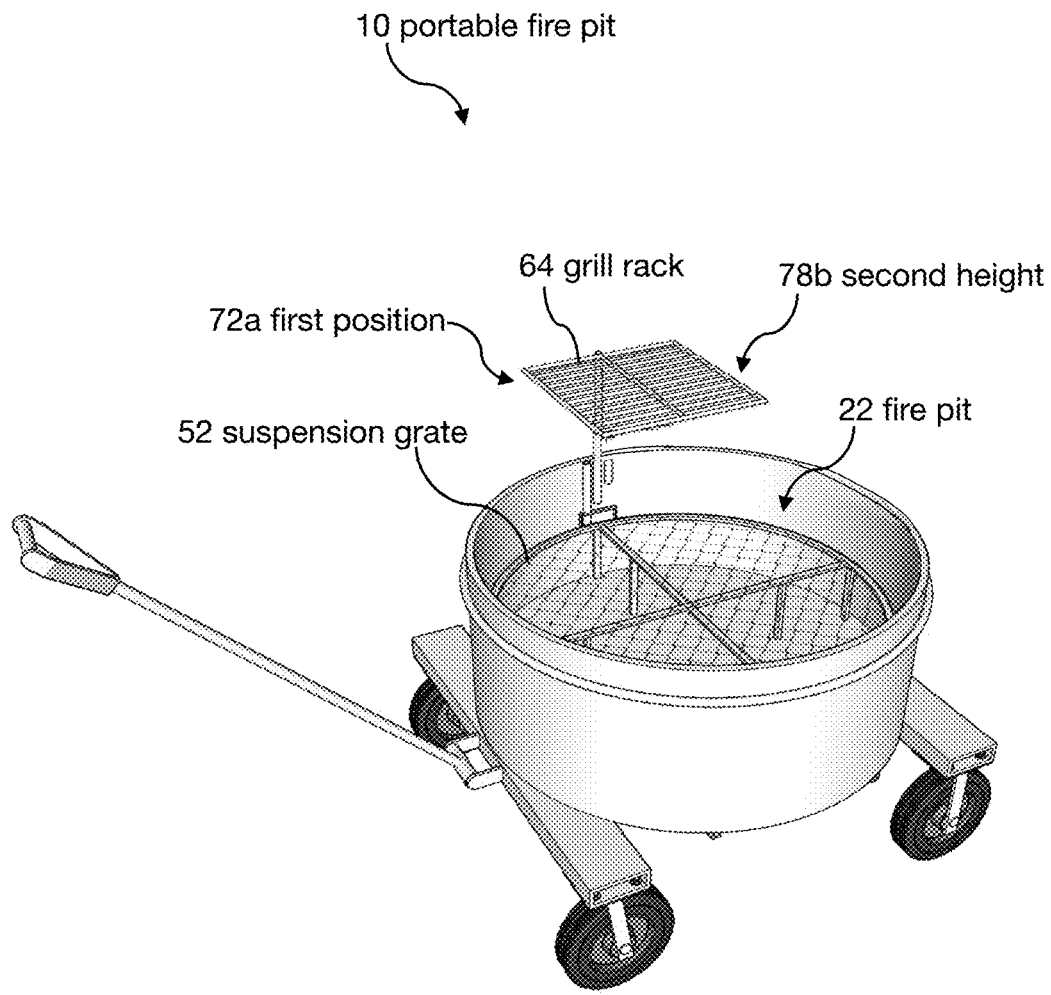
Figure 18:
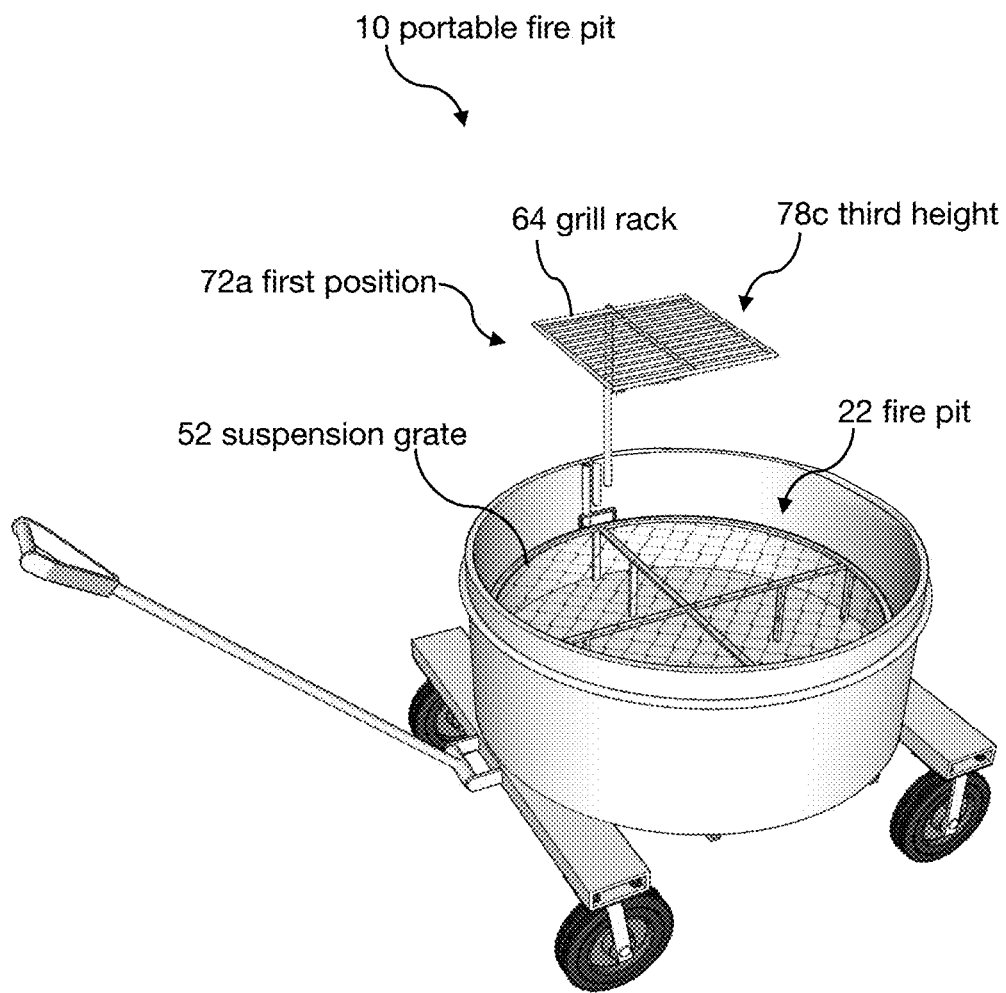

FIGS. 17 and 18 illustrate the grill rack 64 at a second height 78b and third height 78c, respectively. At the second height 78b, as shown in FIG. 17, the grill rack 64 may be coupled to the second post receiver (e.g., the middle post receiver). At the third height 78c, as shown in FIG. 18, the grill rack 64 may be coupled to the third post receiver (e.g., the rightmost/shortest post receiver). It should be noted that the first, second, and third heights 78a, 78b, 78c may be slightly exaggerated in the Figures, in order to clearly demonstrate the different heights. In some embodiments, there is only a few inches of difference between the first, second, and third heights 78a, 78b, 78c. The ability to place the grill rack 64 at different heights above the fire pit 22 may be helpful for a number of reasons. For example, if a large fire is built in the fire pit 22 using firewood 54, as illustrated in FIGS. 1 and 2, the second or third height 78b, 78c may be preferable to avoid burning any food located on the grill rack 64. However, if a smaller fire is built, for example with charcoal or only one or two pieces of firewood 54, the first height 78a may be suitable for cooking with less risk of burning the food.

As discussed with reference to FIG. 16, FIG. 19 shows the grill rack 64 in the second position 72b. The second position 72b may define a position where the grill rack 64 is mostly, though not completely, pivoted away from the fire pit 22. In some embodiments, the second position 72b defines a position where the grill rack 64 is completely rotated such that none of the grill rack 64 is located over the fire pit 22. A completely rotated position may be ideal for some situations, like ensuring safety when placing food on/taking food off the grill rack 64 by rotating the grill rack 64 as far away from the fire as possible. It should be noted that the grill rack 64 may be configured to rotate between the first position 72a and the second position 72b at any of the first, second, and third heights 78a, 78b, 78c.

Figure 20:
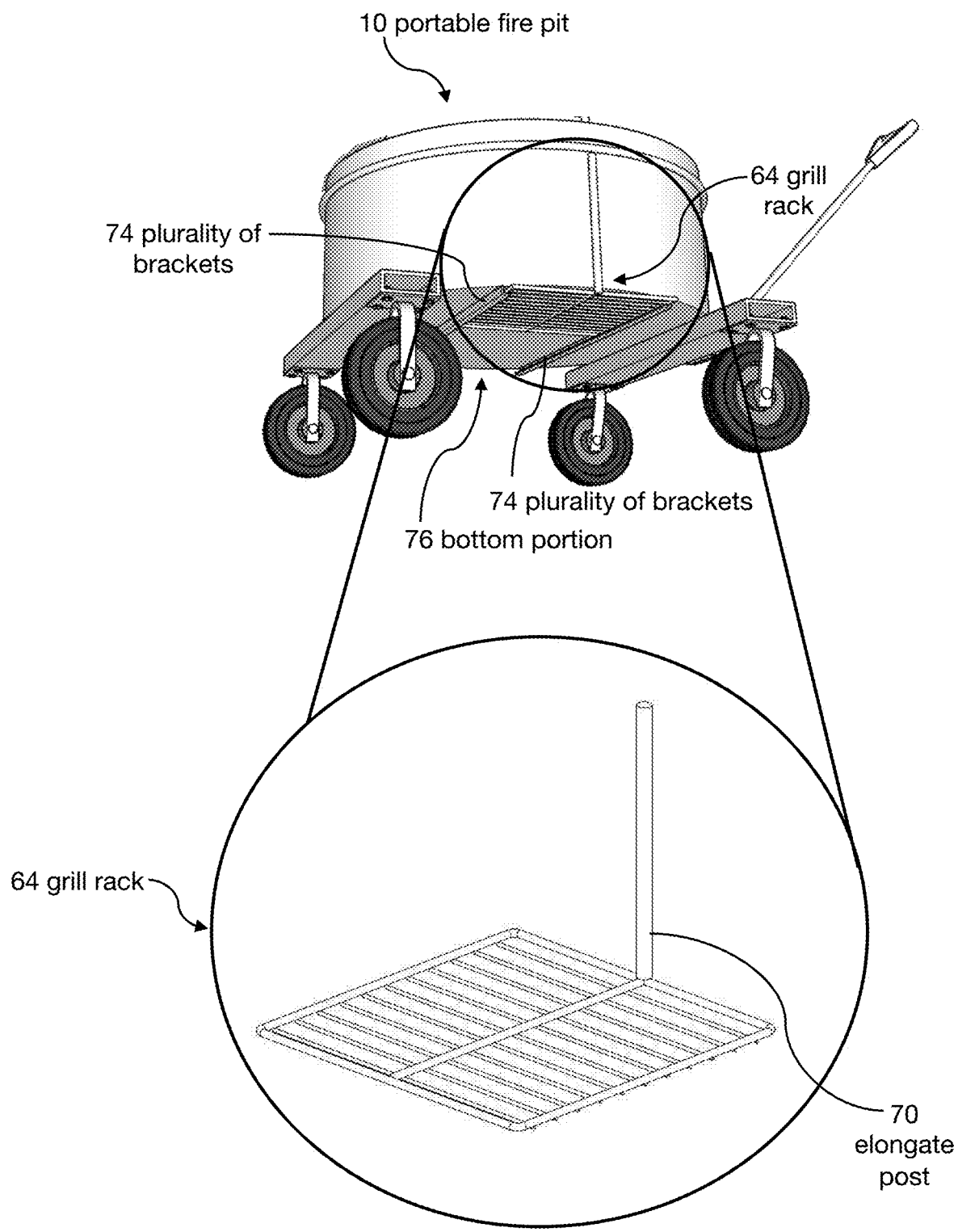
FIG. 20 illustrates a bottom perspective view of a portable fire pit with a grill rack coupled to a bottom portion of the fire pit, according to some embodiments.

FIG. 20 shows a bottom perspective view of the portable fire pit 10, with an inset view of the grill rack 64. As illustrated in FIG. 20, in many embodiments, the fire pit 22 comprises a plurality of brackets 74 located on a bottom portion 76 of the fire pit 22, the plurality of brackets 74 configured to slideably receive the grill rack 64 when the grill rack 64 is not in use. As shown, the plurality of brackets 74 may be configured to slideably receive the grill rack 64 in an inverted position such that the elongate post 70 may be located adjacent the at least one solid vertical wall 26 and extend from the bottom portion 76 of the fire pit 22 to the top portion 30 of the fire pit 22.

The plurality of brackets 74 may be considered a type of rail system comprising two L-shaped rods fixedly coupled to the bottom portion 76 of the fire pit 22. Each L-shaped rod may define the following dimensions: 0.75 inches×0.75 inches×0.125 inches. Each L-shaped rod may be about 27.27 inches long. The L-shaped rods may define dimensions other than those listed in this disclosure, which are intended to convey a non-limiting example. The plurality of brackets 74 may be spaced from one another a distance slightly greater than the width of the grill rack 64, such that the grill rack 64 is securably received. For example, the grill rack 64 may define a width of about 12 inches and the plurality of brackets 74 may be spaced from one another a distance of about 12.375 inches, from outer edge to outer edge. In some embodiments, in order to fit beneath the fire pit 22, the grill rack 64 defines a size that is equal to or less than a distance between the front portion 18 and rear portion 20 of the housing 12. As shown in the Figures, the front portion 18 and rear portion 20 may be physically spaced and separate from one another, with no direct contact between the front and rear portions 18, 20.

Ski Embodiment

Though not illustrated in the Figures, in some embodiments, a portable fire pit comprises skis rather than the first and second pair of wheels 14, 16 of the portable fire pit 10. The portable fire pit may comprise a first pair of skis operatively and removably coupled to a front portion of a housing, a second pair of skis operatively and removably coupled to a rear portion of the housing, and a fire pit coupled to a top portion of the housing. In many embodiments, the portable fire pit described herein is substantially the same as the portable fire pit 10, with the exception of the inclusion of skis rather than wheels. For example, the portable fire pit with skis may also include a handle detachably coupled to the housing, wherein the handle may be configured to allow a user to pull and/or push the portable fire pit and, when detached, the handle may be used as a fire poker.

Similar to the first pair of wheels 14, the first pair of skis may comprise a first ski and a second ski, wherein the first ski may be configured to swivel about a first axis and the second ski may be configured to swivel about a second axis. The handle may be operatively coupled to the first ski and the second ski such that the handle may be configured to swivel at least one of the first ski and the second ski. In some embodiments, the second pair of skis also comprises skis configured to swivel. At least one of the first and second pair of skis may comprise fixed (e.g., non-movable) skis. The portable fire pit with skis may also include wheels substantially similar to the first and second pair of wheels 14, 16, such that the portable fire pit may be interchangeably coupled to either skis or wheels depending on the terrain and weather conditions.

Materials

In some embodiments, many elements of the portable fire pit 10 are comprised of a heavy metallic material, like steel. For example, the housing 12, wheel mounts 44, the at least one vertical wall 26, the handle 48, the suspension grate 52, the grill rack 64, and the plurality of brackets 74 may be comprised of steel or a similar material. In order to enable easy movement of the cover 28/table 40, the cover 28, the at least one foldable leg 36, and the at least one handle 35 may be comprised of a more lightweight metal material, like aluminum. Specifically, each element of the table 40, including the cover 28, the at least one foldable leg 36, and the at least one handle 35 may be comprised of 6061 aluminum. In some embodiments, the grill rack 64 is comprised of aluminum or another lightweight material. The first and second pair of wheels 14, 16 may comprise permanently filled tires, such as tires filled with foam, to prevent the tires from going flat. In many embodiments, the housing 12, the first pair of wheels 14, the second pair of wheels 16, and the fire pit 22 comprise materials that are at least one of rust resistant and waterproof such that the portable fire pit 10 is configured to be positioned in a depth of water and/or snow less than or equal to about twelve inches while maintaining a fire in the fire pit 22.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

The term "about" is used to mean "approximately." For example, the disclosure includes "In some embodiments, the portable fire pit 10 weighs between about 100 and about 200 pounds." In this context, "between about 100 and about 200 pounds" is used to mean between "approximately" 100 and "approximately" 200 pounds. A weight range between 90 and 210 pounds would fall into the understanding of "about" as used in this disclosure.

The term "substantially" is used to mean "completely" or "nearly completely." For example, the disclosure includes "The elongate post 70 may be substantially centered on one edge of the grill rack 64." In this context, "substantially centered" is used to mean "completely centered" or "nearly completely centered." The elongate post 70 may be off-center by an inch or two in either direction, and still fall into the understanding of "substantially" centered as used in this disclosure.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A portable fire pit, comprising:
   a housing;
   a first pair of wheels operatively coupled to a front portion of the housing;
   a second pair of wheels operatively coupled to a rear portion of the housing;
   a fire pit coupled to a top portion of the housing, wherein the fire pit comprises at least one solid vertical wall; and
   a suspension grate detachably coupled to the fire pit, wherein the suspension grate is configured to hold firewood, and wherein the suspension grate comprises a plurality of handles coupled to a top surface of the suspension grate, the plurality of handles configured to enable a user to move the suspension grate.

2. The portable fire pit of claim 1, further comprising a cover configured to adjoin a top portion of the fire pit such that the cover extends across an open portion of the fire pit, wherein the cover is configured to extinguish a flame located within the fire pit, the cover comprising at least one handle configured to enable a user to move the cover.

3. The portable fire pit of claim 2, further comprising at least one foldable leg coupled to a bottom portion of the cover such that when the cover is adjoined to the fire pit, the at least one foldable leg is located inside the fire pit.

4. The portable fire pit of claim 3, wherein the at least one foldable leg is configured to unfold and restably couple to a ground surface such that the cover and the at least one foldable leg form a table.

5. The portable fire pit of claim 4, wherein the cover defines a flat cover, the flat cover comprising a solid, non-vented surface.

6. The portable fire pit of claim 2, wherein the fire pit defines a round fire pit and the at least one solid vertical wall comprises a continuous solid vertical wall extending around an entire perimeter of the fire pit.

7. The portable fire pit of claim 1, wherein the first pair of wheels comprises a first swivel caster wheel and a second swivel caster wheel, and wherein the second pair of wheels comprises a first fixed caster wheel and a second fixed caster wheel, wherein at least one of the first pair of wheels and the second pair of wheels comprises at least one locking wheel.

8. The portable fire pit of claim 7, wherein each of the first swivel caster wheel, the second swivel caster wheel, the first fixed caster wheel, and the second fixed caster wheel is configured to couple to at least one wheel mount located on the housing.

9. The portable fire pit of claim 1, further comprising a handle detachably coupled to the housing, wherein the handle is configured to allow a user to pull the portable fire pit, and wherein when the handle is detached from the housing the handle is configured to operate as a fire poker.

10. The portable fire pit of claim 9, wherein the first pair of wheels comprises a first wheel and a second wheel, wherein the first wheel is configured to swivel about a first axis, and the second wheel is configured to swivel about a second axis, and wherein the handle is operatively coupled to the first wheel and the second wheel such that the handle is configured to swivel at least one of the first wheel and the second wheel.

11. The portable fire pit of claim 1, wherein the suspension grate comprises a plurality of legs coupled to a bottom surface of the suspension grate and located opposite the plurality of handles, wherein the plurality of legs are configured to restably couple to an internal bottom portion of the fire pit, such that the top surface of the suspension grate is located a first distance above the internal bottom portion of the fire pit, wherein the first distance is less than or equal to about five inches.

12. The portable fire pit of claim 1, further comprising:
    a plurality of post receivers coupled to an interior portion of the at least one solid vertical wall; and
    a grill rack including an elongate post extending away from the grill rack, wherein the grill rack is configured to hold a food product and the grill rack is configured to be located over the fire pit,
    wherein the plurality of post receivers are configured to receive at least a portion of the elongate post, and wherein each post receiver of the plurality of post receivers defines a different height, thereby positioning the grill rack at a different height over the fire pit.

13. The portable fire pit of claim 12, wherein the plurality of post receivers comprises a first post receiver defining a first height, a second post receiver defining a second height, and a third post receiver defining a third height.

14. The portable fire pit of claim 12, wherein the grill rack is configured to rotate between a first position and a second position, wherein in the first position at least a portion of the grill rack is located directly over the fire pit, and in the second position the at least the portion of the grill rack is not located directly over the fire pit.

15. The portable fire pit of claim 14, wherein the grill rack defines a first size and the fire pit defines a second size, wherein the first size is smaller than the second size.

16. The portable fire pit of claim 12, wherein the fire pit comprises a plurality of brackets located on a bottom portion of the fire pit, the plurality of brackets configured to slideably receive the grill rack when the grill rack is not in use.

17. The portable fire pit of claim 16, wherein the plurality of brackets is configured to slideably receive the grill rack in an inverted position such that the elongate post is configured to be located adjacent the at least one solid vertical wall and extend from the bottom portion of the fire pit to the top portion of the fire pit.

18. The portable fire pit of claim 1, wherein the front portion of the housing is physically separate and spaced from the rear portion of the housing.

19. The portable fire pit of claim 1, wherein the housing, the first pair of wheels, the second pair of wheels, and the fire pit comprise materials that are rust resistant.

20. The portable fire pit of claim 1, wherein the housing, the first pair of wheels, the second pair of wheels, and the fire pit comprise materials that are waterproof, such that the portable fire pit is configured to be positioned in a depth of water less than or equal to about twelve inches while maintaining a fire in the fire pit.

* * * * *